United States Patent
Madhavan et al.

(10) Patent No.: US 11,032,810 B2
(45) Date of Patent: Jun. 8, 2021

(54) WIRELESS COMMUNICATION DEVICE AND WIRELESS COMMUNICATION METHOD INCLUDING HISTORY OF UPLINK MULTI-USER TRANSMISSION

(71) Applicant: KABUSHIKI KAISHA TOSHIBA, Tokyo (JP)

(72) Inventors: Narendar Madhavan, Kawasaki Kanagawa (JP); Tomoko Adachi, Kawasaki Kanagawa (JP)

(73) Assignee: KABUSHIKIKAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/429,768

(22) Filed: Jun. 3, 2019

(65) Prior Publication Data
US 2019/0289577 A1    Sep. 19, 2019

Related U.S. Application Data

(63) Continuation of application No. 15/450,373, filed on Mar. 6, 2017, now Pat. No. 10,334,578.

(30) Foreign Application Priority Data

Jul. 15, 2016 (JP) ................................. 2016-140187

(51) Int. Cl.
*H04W 72/04* (2009.01)
*H04W 72/02* (2009.01)
(Continued)

(52) U.S. Cl.
CPC ........... *H04W 72/042* (2013.01); *H04W 8/22* (2013.01); *H04W 72/02* (2013.01);
(Continued)

(58) Field of Classification Search
CPC ..... H04W 72/042; H04W 72/02; H04W 8/22; H04W 72/0446; H04W 72/048; H04W 74/0816; H04W 84/12
See application file for complete search history.

(56) References Cited

U.S. PATENT DOCUMENTS 9,942,925 B2     4/2018 Merlin et al.
10,334,578 B2 *  6/2019 Madhavan ............ H04W 72/02
(Continued)

FOREIGN PATENT DOCUMENTS

WO    WO-2016/080335 A1    5/2016
WO    WO-2016/112146 A1    7/2016
(Continued)

OTHER PUBLICATIONS

Khorov, E. et al. "Channel Access Efficiency", IEEE 802.11-16/684r2, IITP RAS, May 2016, pp. 1-14.
(Continued)

*Primary Examiner* — Walli Z Butt
(74) *Attorney, Agent, or Firm* — Foley & Lardner LLP

(57) ABSTRACT

According to one embodiment, a wireless communication device includes: controlling circuitry configured to change a value of a first parameter in accordance with a history of uplink multi-user transmission or whether capability of uplink multi-user transmission is in an enabled or disabled state, the first parameter defining an upper limit of duration during which a wireless medium is allowed to be occupied; and a transmitter configured to transmit a first frame.

14 Claims, 23 Drawing Sheets

(51) Int. Cl.
*H04W 8/22* (2009.01)
*H04W 74/08* (2009.01)
*H04W 84/12* (2009.01)

(52) U.S. Cl.
CPC ..... *H04W 72/048* (2013.01); *H04W 72/0446* (2013.01); *H04W 74/0816* (2013.01); *H04W 84/12* (2013.01)

(56) References Cited

U.S. PATENT DOCUMENTS

| | | | | |
|---|---|---|---|---|
| 2014/0126471 | A1* | 5/2014 | Sampath | H04W 48/16 370/328 |
| 2015/0172011 | A1 | 6/2015 | Aboul-Magd | |
| 2016/0128024 | A1 | 5/2016 | Frederiks et al. | |
| 2016/0183305 | A1* | 6/2016 | Huang | H04W 74/0833 370/329 |
| 2016/0198500 | A1 | 7/2016 | Merlin et al. | |
| 2016/0227579 | A1* | 8/2016 | Stacey | H04W 74/0833 |
| 2017/0078003 | A1* | 3/2017 | Ghosh | H04W 74/04 |
| 2017/0171886 | A1 | 6/2017 | Nabetani et al. | |
| 2017/0202017 | A1 | 7/2017 | Zhou et al. | |
| 2017/0202023 | A1 | 7/2017 | Zhou et al. | |
| 2017/0325266 | A1 | 11/2017 | Kim | |

FOREIGN PATENT DOCUMENTS

| | | |
|---|---|---|
| WO | WO-2016/175328 A1 | 11/2016 |
| WO | WO-2016/175329 A1 | 11/2016 |
| WO | WO-2017/123947 A1 | 7/2017 |

OTHER PUBLICATIONS

IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11 ac™, The Institute of Electrical and Electronics Engineers, Inc., Dec. 2013, pp. 1-425.
IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.
Stacey, R. "Specification Framework for TGax", IEEE 802.11-15/0132r17, Intel, May 2016, pp. 1-61.
Stacey, Robert: "Specification Framework for TGax", IEEE Nov. 15, 0132-17-00ax-spec-framework, Intel, May 2016, pp. 1-61.
Extended European Search Report dated Sep. 21, 2017 as issued in corresponding European Application No. 17158859.3.
Leonardo Lanante (Kyutech): "Random Access UL MU Resource Allocation and Indication; 11-16-0340-01-00ax-random-access-ul-mu-resource-allocation-and-indication", IEEE Draft; 11-16-0340-01-00AX-Random-Access-UL-MU-Resource-Allocation-AND-Indication, IEEE-SA Mentor, Piscataway, NJ USA, vol. 802.11ax, No. 1, Mar. 14, 2016 (Mar. 14, 2016), pp. 1-11, XP068105209, [retrieved on Mar. 14, 2016].
John(Ju-Hyung) Son, Further Considerations on Legacy Fairness with Enhanced CCA, IEEE802.11-15/0374r1,IEEE, URL:https://mentor.ieee.org/802.11/dcn/15/11-15-0374-01-00ax-further-considerations-on-legacy-fairness-with-enhanced-cca.pptx,Mar. 10, 2015 1-9.

* cited by examiner

| AC | CWmin | CWmax | AIFSN | Max TXOP |
|---|---|---|---|---|
| Background (AC_BK) | 15 | 1023 | 7 | 0 |
| Best Effort (AC_BE) | 15 | 1023 | 3 | 0 |
| Video (AC_VI) | 7 | 15 | 2 | 3.008ms |
| Voice (AC_VO) | 3 | 7 | 2 | 1.504ms |
| Legacy DCF | 15 | 1023 | 2 | 0 |

(A)
| AP CW | 3 |
|---|---|
| STA 1 EDCA_CW_VO | 4 |
| STA 2 EDCA_CW_BE | 15 |

(B)
| AP CW | 0 |
|---|---|
| STA 1 EDCA_CW_VO | 1 |
| STA 2 EDCA_CW_BE | 12 |

(C)
| AP CW | No frame |
|---|---|
| STA 1 EDCA_CW_VO | 0 |
| STA 2 EDCA_CW_BE | 11 |

| Frame Control | Duration /ID | Address 1 | Address 2 | Common Info | Per User Info 1 | Per User Info 2 | ... | Per User Info n | FCS |

(A) Trigger Frame

| Length | Cascade Indication | CS Required | Spatial Reuse | BW | CP and LTF Type | MU MIMO LTF Mode | # of LTFs |
| STBC | LDPC Extra Symbol | AP TX Power | Packet Extension | Trigger Type | Timer Value | Type-dependent Common Info |

(B) Common Info field

| User Identifier | RU Allocation | Coding Type | MCS | DCM | SS Allocation | Target RSSI | Timer Value | Type dependent Per User Info |

(C) Per User Info field

FIG. 17

WIRELESS COMMUNICATION DEVICE AND WIRELESS COMMUNICATION METHOD INCLUDING HISTORY OF UPLINK MULTI-USER TRANSMISSION

CROSS-REFERENCE TO RELATED APPLICATIONS

This application is a continuation of U.S. patent application Ser. No. 15/450,373, filed Mar. 6, 2017, which is based upon and claims the benefit of priority from Japanese Patent Application No. 2016-140187, filed on Jul. 15, 2016; the entire contents of which are incorporated herein by reference.

FIELD

Embodiments of the present invention relate to a wireless communication device and a wireless communication method.

BACKGROUND

Numerous base stations (or access points; APs) are arranged in a wireless LAN network compliant with IEEE 802.11ax which is a next-generation wireless LAN standard. Specifically, numerous basic service sets (BSS) are arranged in the wireless LAN network. Also, considered in this context is a high-density environment in which numerous terminals or stations (STAs) are interconnected. Multi-user transmission technologies such as multi-user MIMO (Multi-User Multiple-Input Multiple-Output: MU-MIMO) and orthogonal frequency division multiplexing access (OFDMA) allow numerous terminals to simultaneously carry out uplink (UL) transmission to the base station, which is called uplink multi-user (UL-MU) transmission.

Terminals access the wireless medium traditionally using the enhanced distributed channel access (EDCA) method. EDCA defines a set of parameters defined in accordance with access categories (ACs). Backoff counters for the respective ACs are reset when the respective ACs are successfully transmitted. When the channel becomes busy during a transmission wait state, countdown of the backoff counter is suspended while the busy state continues. According to IEEE 802.11ax, multiple terminals are simultaneously given permission to make uplink channel access using a trigger frame transmitted by the base station. Although the period of UL-MU transmission is thought to be handled as a state where the channel is busy, it may be the case that the frame that was backed off for transmission gets transmitted when triggered for UL-MU. In such a scenario, it is necessary to consider how to handle the backoff counters. Further, the problem of fairness arises as a terminal that can carry out UL-MU transmission will have more transmission opportunities using the normal uplink single-user (UL-SU) transmission according to which the terminal itself obtains the access right to access a wireless medium and carry out intended transmission without uplink multiplexing.

Use of two parameters has been proposed as one of the methods of handling the EDCA parameters in UL-MU. According to this proposal, a contention parameter of the terminal that uses UL-MU-MIMO is set to a value which is different than that for a terminal that does not use UL-MU-MIMO. Also, in this context, it has been further proposed that the base station present a pruning value, according to which multiple terminals determines whether to perform contention to get the access right to access a channel as a wild-card resource on the basis of the pruning value.

According to another method, each of terminals to which resource units (RUs) are assigned by the trigger frame uses a different EDCA parameter set. CWmin and AIFSN which are EDCA parameters are incremented relative to a case where UL-MU transmission is not performed, and thereby the base station restricts single-user (SU) transmission using EDCA with regard to these terminals. This will mitigate the contention. However, the problem of fairness remains to be unsolved between the terminal that can carry out UL-MU transmission and a terminal that cannot carry out UL-MU.

BRIEF DESCRIPTION OF THE DRAWINGS

FIG. 17 is a diagram illustrating an exemplary format of a trigger frame;

DETAILED DESCRIPTION

According to one embodiment, a wireless communication device includes: controlling circuitry configured to change a value of a first parameter in accordance with a history of uplink multi-user transmission or whether capability of uplink multi-user transmission is in an enabled or disabled state, the first parameter defining an upper limit of duration during which a wireless medium is allowed to be occupied; and a transmitter configured to transmit a first frame.

Hereinafter, embodiments of the present invention will be described with reference to the drawings. The entire contents of IEEE Std 802.11™-2012 and IEEE Std 802.11ac™-2013, known as the wireless LAN specification and IEEE 802.11-15/0132r17 dated on May 25, 2016 which is Specification Framework Document directed to IEEE Std 802.11ax as a next generation wireless LAN standards are herein incorporated by reference in the present specification.

First Embodiment

Figure 1:
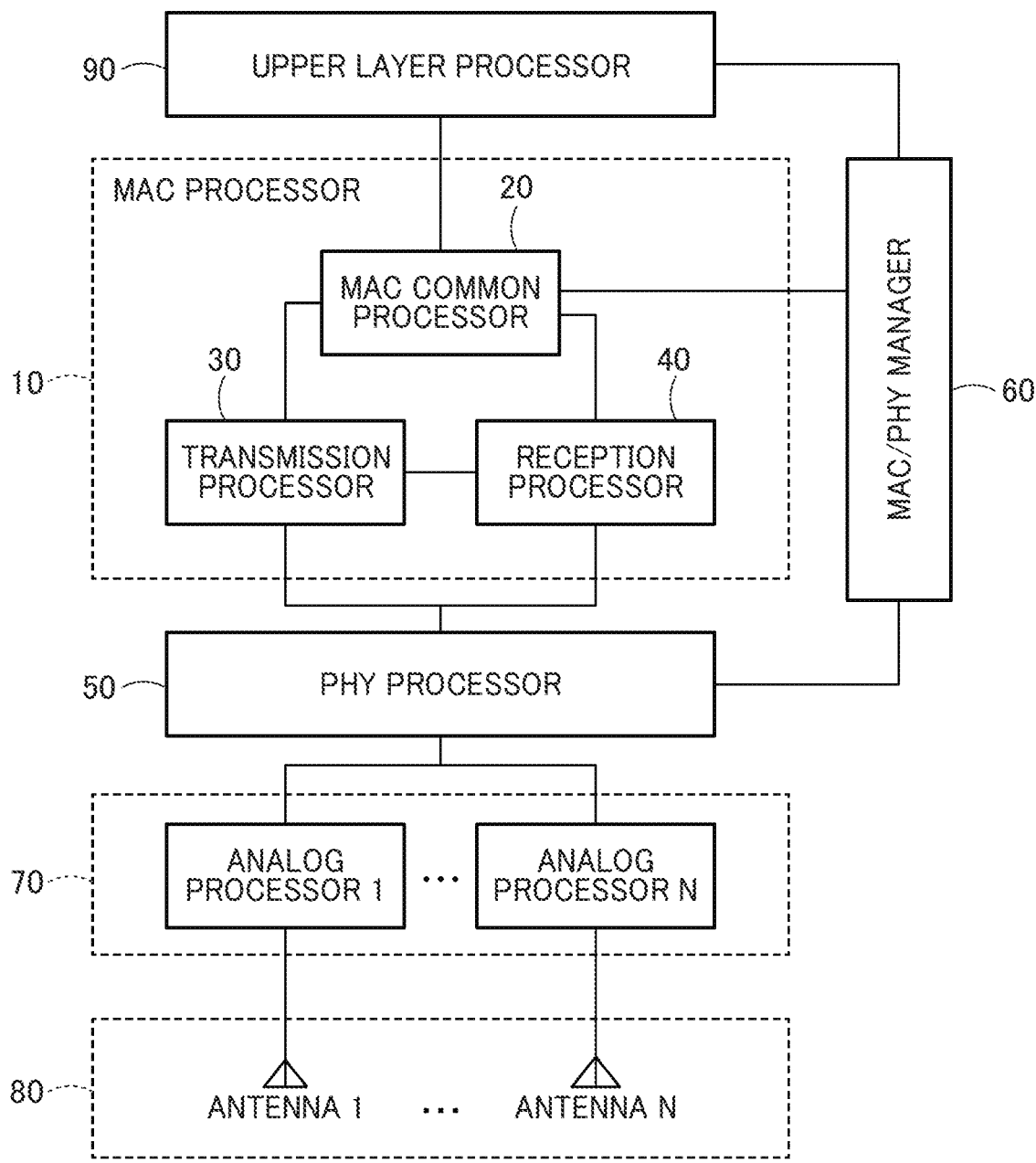
FIG. 1 is a diagram illustrating a functional block diagram of a wireless communication device according to an embodiment of the present invention.

FIG. 1 illustrates a functional block diagram of a wireless communication device according to the first embodiment of the present invention is illustrated in FIG. 1. This wireless communication device can be implemented in a wireless communication base station (hereinafter referred to as a base station or an access point) or in a wireless communication terminal (hereinafter referred to as a terminal) that communicates with the base station. The base station is one mode of the wireless communication terminal (or the terminal) in that the base station has the same or similar communication functions with those of the terminal with exception of the base station having a relay function. The function of the present invention can be realized in which of the base station and the terminal. When a wireless communication terminal or a terminal is mentioned in the following explanations, it may refer to a base station as long as the terminal and the base station should be particularly discriminated from each other.

As illustrated in FIG. 1, a wireless communication device incorporated in a terminal (which may be either a terminal of non-base station or the base station) includes upper layer processor 90, MAC processor 10, physical (PHY) processor 50, MAC/PHY manager 60, analog processor 70 (analog processors 1 to N), and antenna 80 (antennas 1 to N), where N represents an integer equal to or larger than 1. In the figure, the N analog processors and the N antennas are connected in pairs with each other, but the configuration is not limited to the illustrated one. For example, one analog processor and two or more antennas may be connected to this analog processor in a shared manner.

MAC processor 10, MAC/PHY manager 60, and PHY processor 50 correspond to a mode of controller that carries out processing associated with communications with other terminals (including the base station). Analog processor 70 corresponds, for example, to a wireless communicator (a transmitter and a receiver) that transmits and receives signals via antenna 80. The functions of the controller may be performed by software (programs) that runs on a processor such as a CPU or may be performed by hardware, or may be performed by both of the software and the hardware. The software may be stored in a storage medium such as a memory device including a ROM, a RAM, etc., a hard disk, or an SSD and read therefrom to be executed. The memory device may be a volatile memory device such as an SRAM or a DRAM, or a non-volatile memory device such as a NAND or an MRAM.

Upper layer processor 90 is configured to carry out processing for the Medium Access Control (MAC) layer associated with the upper layer or layers. Upper layer processor 90 can exchange signals with MAC processor 10. As the upper layer, TCP/IP, UDP/IP, and the application layer upper than these two protocols may be mentioned as typical examples but this embodiment is not limited to them. Upper layer processor 90 may include a buffer for exchanging data between the MAC layer and the upper layer or layers. It may also be considered that it may be connectable to a wired infrastructure via upper layer processor 90. The buffer may be a memory, an SSD or a hard disk etc. In the case of memory, the memory may be a volatile memory device such as an SRAM or a DRAM, or a non-volatile memory device such as a NAND or an MRAM.

MAC processor 10 is configured to carry out processing for the MAC layer. As described above, MAC processor 10 can exchange signals with upper layer processor 90. Further, MAC processor 10 can exchange signals with PHY processor 50. MAC processor 10 includes MAC common processor 20, transmission processor 30, and reception processor 40.

MAC common processor 20 is configured to carry out common processing for transmission and reception in the MAC layer. MAC common processor 20 is connected to and exchanges signals with upper layer processor 90, transmission processor 30, reception processor 40, and MAC/PHY manager 60.

Transmission processor 30 and reception processor 40 are connected to each other. Also, transmission processor 30 and reception processor 40 are each connected to MAC common processor 20 and PHY processor 50. Transmission processor 30 is configured to carry out transmission processing in the MAC layer. Reception processor 40 is configured to carry out reception processing in the MAC layer.

PHY processor 50 is configured to carry out processing for a physical layer (PHY layer). As described above, PHY processor 50 can exchange signals with MAC processor 10. PHY processor 50 is connected via analog processor 70 to antenna 80.

MAC/PHY manager 60 is connected to upper layer processor 90, MAC processor 10 (more specifically, MAC common processor 20), and PHY processor 50. MAC/PHY manager 60 is configured to manage MAC operation and PHY operation in the wireless communication device.

Analog processor 70 includes an analog-to-digital and digital-to-analog (AD/DA) converter and a radio frequency (RF) circuit. Analog processor 70 is configured to convert a digital signal from PHY processor 50 into an analog signal having a desired frequency and transmit it from antenna 80, or convert a high-frequency analog signal received from antenna 80 into a digital signal. It is considered here that although AD/DA conversion is carried out by analog processor 70, another configuration is also possible according to which PHY processor 50 has the AD/DA conversion function.

The wireless communication device in accordance with this embodiment has its constituent element (i.e., incorporates) antenna 80 in one single chip and thereby makes it possible to reduce the mounting area of antenna 80. Further, in the wireless communication device in accordance with this embodiment, as illustrated in FIG. 1, transmission processor 30 and reception processor 40 shares N antennas 80. By virtue of sharing N antennas 80 by transmission processor 30 and reception processor 40, it is made possible to reduce the size of the wireless communication device of FIG. 1. It is considered here that the wireless communication device in accordance with this embodiment may have a configuration different than the one depicted by way of example in FIG. 1.

In reception of a signal from a wireless medium, analog processor 70 converts an analog signal received by antenna 80 into a baseband signal that can be processed by PHY processor 50, and further converts the baseband signal into a digital signal. PHY processor 50 is configured to receive a digital received signal from analog processor 70 and detect its reception level. The detected reception level is compared with the carrier sense level (threshold). When the reception level is equal to or larger than the carrier sense level, PHY processor 50 outputs a signal indicative of the determination result that the medium (CCA: Clear Channel Assessment) is in the busy state to MAC processor 10 (reception processor 40 to be more precise). When the reception level is less than the carrier sense level, PHY processor 50 outputs a signal indicative of the determination result that the medium (CCA) is in the idle state to MAC processor 10 (reception processor 40 to be more precise).

PHY processor 50 is configured to carry out processing associated with Multi-User Multiple-Input Multiple-Output (MU-MIMO) or Orthogonal Frequency Division Multiplexing Access (OFDMA) as uplink multi-user (UL-MU) communications. Uplink MU-MIMO is denoted as "UL-MU-MIMO" and uplink OFDMA as "UL-OFDMA." Downlink MU-MIMO is denoted as "DL-MU-MIMO" and downlink OFDMA as "DL-OFDMA."

UL-MU-MIMO is a scheme of communications according to which the base station simultaneously receives frames transmitted from multiple terminals in a spatially multi-plexed manner (simultaneously in the same frequency band) through multiple antennas, and applies MIMO demodulation to the received signals, thereby separating the demodulated signals into the frames of the terminals. The base station estimates an uplink channel response using a preamble signal added at the beginning of the frame transmitted from the individual terminal. The preamble signals are orthogonal to each other between or among the terminals. The base station is allowed to correctly spatially separate (decode) the fields that follow the preamble signal using the channel response. The preamble signal corresponds to an example of the resources according to this embodiment.

OFDMA is a scheme of communications according to which multiple resource units including one or more sub-carriers are assigned to the respective multiple terminals and the base station simultaneously carries out transmissions and receptions with the multiple terminals simultaneously. The resource unit is a frequency component that is the smallest unit of the resources for communications. The resource unit corresponds to one example of the resources according to this embodiment.

Further details of UL-MU-MIMO and OFDMA will be described later. It should be noted that PHY processor 50 may carry out processing associated with a scheme configured by combining UL-MU-MIMO and UL-OFDMA.

PHY processor 50 is configured to carry out decoding processing (including demodulation and decoding error correction code etc.) for the received signal, processing of removing a physical header (PHY header) including a preamble, or the like, and extracts a payload. According to IEEE 802.11 standard, this payload is called physical layer convergence procedure (PLCP) service data unit (PSDU) on the PHY side. PHY processor 50 delivers the extracted payload to reception processor 40, and reception processor 40 handles it as a MAC frame. According to IEEE 802.11 standard, this MAC frame is called medium access control (MAC) protocol data unit (MPDU). In addition, PHY processor 50, when it started to receive the reception signal, notifies the fact of having started reception of the reception frame to reception processor 40, and, when it completed the reception of the reception signal, notifies the fact of having completed the reception to reception processor 40. Detail in a case of using A (Aggregated)-MPDU is described later. Also, PHY processor 50, when the reception signal has been decoded successfully as the physical packet (PHY packet) (when it does not detect an error), notifies the completion of the reception of the reception signal and delivers a signal indicative of the fact that the medium is in the idle state to reception processor 40. PHY processor 50, when it detected an error in the reception signal, notifies the fact that the error has been detected with an appropriate error code in accordance with the error type to reception processor 40. Also, PHY processor 50, at the timing at which the medium has been determined to enter the idle state, notifies a signal indicative of the fact that the medium is in the idle state to reception processor 40.

MAC common processor 20 performs intermediary processing for delivery of transmission data from upper layer processor 90 to transmission processor 30 and for delivery of reception data from reception processor 40 to upper layer processor 90. According to IEEE 802.11 standard, the data in this MAC data frame is called medium access control (MAC) service data unit (MSDU). Also, MAC common processor 20 receives instructions from MAC/PHY manager 60 and then converts the instruction into appropriate form of instructions for transmission processor 30 and reception processor 40 and outputs the converted instructions to these units.

MAC/PHY manager 60 corresponds, for example, to station management entity (SME) in IEEE 802.11 standard. In that case, the interface between MAC/PHY manager 60 and MAC common processor 20 corresponds to MAC subLayer management entity service access point (MLME SAP) in IEEE 802.11 standard, and the interface between MAC/PHY manager 60 and PHY processor 50 corresponds to physical layer management entity service access point (PLME SAP) in IEEE 802.11 wireless local area network (LAN).

It is considered here that although MAC/PHY manager 60 in FIG. 1 is illustrated on the assumption that the functional unit for the MAC management and the functional unit for the PHY management are configured to be integrated with each other, these units may be separately implemented.

MAC/PHY manager 60 holds a management information base (MIB). The MIB holds various pieces of information, such as the capabilities of the own terminal, and the validities of various functions. For example, information on whether the own terminal is an UL-MU (UL-MU-MIMO or UL-OFDMA) compliant terminal or information on whether UL-MU capability is enable (ON) or disable (OFF) in the case of UL-MU compatible terminal may also be stored. A memory for holding and managing the MIB may be included in MAC/PHY manager 60, or separately provided without being included in MAC/PHY manager 60. In a case where the memory for holding and managing the MIB is separately provided besides MAC/PHY manager 60, MAC/PHY manager 60 can refer to the other memory and rewrite rewritable parameters in the memory. The memory may be a volatile memory device such as an SRAM or a DRAM, or a non-volatile memory device such as a NAND or an MRAM. Alternatively, the memory may be a storage device such as an SSD or a hard disk. The base station can receive such information at other non-base station terminals, by means of notification from the terminals which are non-base stations. In this case, MAC/PHY manager 60 can refer to and rewrite information pertaining to other terminals. A memory for storing information pertaining to the other terminals may be held and managed separately from the MIB. In this case, it is configured so that MAC/PHY manager 60 or MAC common processor 20 can refer to or rewrite the other memory. Also, MAC/PHY manager 60 of the base station may include a selection function to select terminals to which the resources for UL-MU are simultaneously assigned in carrying out UL-MU on the basis of various pieces of information of terminals as non-base stations or on the basis of requests from the terminals. Also, MAC/PHY manager 60 or MAC processor 10 may manage a transmission rate applied to a MAC frame and a physical header to be transmitted. Also, MAC/PHY manager 60 of the base station may define and manage a supported rate set which is a set of rates supported by the base station. The supported rate set may include a mandatory rate a terminal connected to the base station has to support and an optional rate.

MAC processor 10 is configured to handle three types of MAC frames, i.e., a data frame, a control frame, and a management frame, and carry out various processing procedures defined in the MAC layer. Here, the three types of MAC frames are described.

The management frame is for use in management of communication link with another terminal. As the management frame, for example, Beacon frame may be mentioned. The Beacon frame notifies attribute and synchronization information of a group to form a wireless communication group which is a Basic Service Set (BSS) in IEEE 802.11 standard. Also, a frame for authentication or establishing the communication link may also be mentioned. It is considered here that a state where a certain terminal completed exchange of information necessary for establishing a wireless communication with another terminal is expressed here as (the state where) the communication link is established. As the exchange of necessary information, for example, notification of the functions that the device itself supports (for example, information on whether the terminal is compatible with UL-MU or information on on/off of UL-MU capability), and negotiation regarding settings of a scheme may be mentioned. The management frame is generated on the basis of the instruction received by transmission processor 30 from MAC/PHY manager 60 via MAC common processor 20.

With regard to the management frame, transmission processor 30 includes a notifier which notifies various pieces of information to other terminals by the management frame. As for this management frame, for example, an association request frame used in the association process which is one of the procedures for authentication between the terminal and the base station or a reassociation request frame used in the reassociation process may be mentioned. The base station may notify information on whether the base station is UL-MU supportability or information on on/off of UL-MU capability to non-base station terminal via the management frame. This management frame may be, for example, a beacon frame, or a probe response frame that is a response to a probe request frame transmitted from the non-base station terminal. The base station has the function of grouping the terminals connected to the own station and the notifier of the base station may notify the group IDs to which the terminals belong through the management frames. The management frame may be, for example, a group ID management fame. The group ID may be an extended ID from a group ID defined for downlink MU-MIMO (Multi-User Multi-Input Multi-Output) (DL-MU-MIMO) in IEEE Std 802.11ac-2013 so as to cover use in UL-MU, or may be one defined by a different method.

Association ID (AID) is described below. An AID is an identifier (terminal identifier) assigned by the base station to a terminal in an association process for the terminal to be connected to the base station so that the terminal is allowed to exchange data frames in the BSS serviced by the base station. The association process specifically is a process that becomes successful when an association request frame is transmitted from the terminal to the base station and an association response frame is transmitted from the base station to the terminal and a Status Code field in an association response frame is set to 0 which indicates "success." Communication capability of the transmitting terminal is included in both of the association request frame and the association response frame, by virtue of which each of both parties receiving either of them are allowed to recognize the communication capability of their counterpart. When the terminal Status Code field in the association Response frame is set to 0 indicating "success," then the AID is extracted from an AID field (16 bits) in the same frame and the extracted AID is used as the AID of the transmission destination terminal of this frame. In other words, at this point, the AID is assigned from the base station to the terminal, and, on the side of the terminal, the terminal is now placed in the AID valid state. In the state where this base station is connected to the terminal (in the state of association), the AID of the terminal is valid. Meanwhile, when a disassociation frame is transmitted from the base station to this terminal and this terminal receives the same disassociation frame, or when a disassociation frame is transmitted from this terminal to the base station, the AID of this terminal becomes invalid (null). It will be appreciated that, in any terminal in a state where it has not yet undergone the association process with any one of base stations, the AID thereof is invalid (null). The state where the AID is invalid (null) may be expressed as a state where the AID is not specified.

Reception processor 40 has a receiver that receives various types of information via the management frame from other terminals. As one example, the receiver of the non-base station terminal may receive information on whether each terminal is an UL-MU compliant terminal or information on whether UL-MU capability is on. The receiver of the non-base station terminal may receive information on a channel width (an available largest channel width) supported by each terminal in a case of a legacy terminal (IEEE 802.11n compliant terminal or IEEE 802.11ac compliant terminal). The receiver of the terminal may receive information on whether the base station supports UL-MU.

The examples of the information to be transmitted and received via the management frame as described above are merely examples and various other types of information can be transmitted and received via the management frame between terminals (including the base station). For example, the UL-MU compliant terminal may information on a resource which the terminal hopes to use for UL-MU transmission. In this case, the base station may perform resource allocation on the terminals for UL-MU communication based on the above information.

The data frame is for use in transmission of data to another terminal in a state where the communication link is established with the other terminal. For example, data is generated in the terminal by an operation of an application by a user, and the data is carried by the data frame. Specifically, the generated data is delivered from upper layer processor 90, via MAC common processor 20, and to transmission processor 30, the data is put into the frame body field by transmission processor 30 and a MAC header is added to generate the data frame. In PHY processor 50, a physical header is added to the data frame to generate a physical packet. The physical packet is transmitted via analog processor 70 and antenna 80. When a physical packet is received in physical processor 50, processing on a physical layer is performed based on the physical header to extract a MAC frame (here, data frame) to transmit the data frame to reception processor 40. Also, when reception processor 40 receives the data (recognizes that the received MAC frame is a data frame), reception processor 40 extracts the information in the frame body field as data, and delivers the extracted data via MAC common processor 20 to upper layer processor 90. As a result, operations occur on applications such as writing, reproduction, and the like of the data.

The control frame is for use in control in transmission and reception (exchange) of the management frame and the data frame to/from (with) the other wireless communication device. As the control frame, for example, RTS (Request to Send) frame, CTS (Clear to Send) frame may be mentioned which are exchanged with the other wireless communication device to make a reservation of the wireless medium prior to starting exchange of the management frame and the data frame. Also, as another control frame, an acknowledgement response frame for acknowledgement of the received management frame and the received data frame may be mentioned. As an example of the acknowledgement response frame, ACK (Acknowledgement) frame, BA (Block ACK) frame, and the like may be mentioned. CTS frame can also be said to be a frame indicative of the acknowledgement response because it is transmitted as a response to an RTS frame. CF-End frame is also one of the control frames. The CF-End frame is a frame that announces end of a transmission opportunity (TXOP) after CFP (Contention Free Period) or after having acquired the access right (transmission right), i.e., a frame for permission of access to a wireless medium. TXOP indicates duration (a period of time) during which the medium can be occupied. These control frames are generated by transmission processor 30. With regard to a control frame transmitted as a response to the received MAC frame (CTS frame, ACK frame, BA frame, etc.), reception processor 40 determines the necessity of transmission of a response frame (control frame), and outputs information necessary for frame generation (type of the control frame, information to be specified in an RA (Receiver Address) field, etc.) along with a transmission instruction to transmission processor 30. Transmission processor 30 generates an appropriate control frame on the basis of the information necessary for the frame generation and the transmission instruction.

When a MAC frame is transmitted on the basis of CSMA/CA (Carrier Sense Multiple Access with Collision Avoidance), MAC processor 10 needs to acquire the access right (transmission right) on the wireless medium. Transmission processor 30, on the basis of carrier sense information from reception processor 40, measures transmission timing. Transmission processor 30, in accordance with the transmission timing, gives the transmission instruction to PHY processor 50, and further delivers the MAC frame thereto. In addition to the transmission instruction, transmission processor 30 may instruct a modulation scheme and a coding scheme to be used in the transmission. In addition to them, transmission processor 30 may provide an instruction regarding the transmission power. When MAC processor 10, after having acquired the access right (transmission right), obtained the period of time during which the medium can be occupied (Transmission Opportunity; TXOP), then MAC processor 10 is allowed to continuously exchange the MAC frames with other wireless communication devices although there is some limitation such as the QoS (Quality of Service) attribute. The TXOP is acquired, for example, when the wireless communication device transmits a predetermined frame (for example, an RTS frame) on the basis of CSMA/CA (Carrier Sense Multiple Access with Collision Avoidance) and successfully receives a response frame (for example, a CTS frame) from another wireless communication device. When this predetermined frame is received by the other wireless communication device, the other wireless communication device transmits the above response frame after the elapse of the minimum frame interval (Short InterFrame Space; SIFS). Also, as a method of acquiring the TXOP without using the RTS frame, for example, cases may be mentioned where data frame that requests transmission of the acknowledgement response frame is transmitted directly by the unicast (as will be described later, this frame may be a frame in the form of conjunct frames or conjunct payloads) or a management frame that requests transmission of the acknowledgement response frame is transmitted, and acknowledgement response frame (ACK frame, BlockACK frame or the like) in response thereto is successfully received. Alternatively, when a frame is transmitted that does not request, for the other wireless communication device, transmission of the acknowledgement response frame, in which a period equal to or longer than a time period needed to transmit this frame is specified in Duration/ID field of the frame, then it may be interpreted that with the transmission of this frame, a right to use of the period described in Duration/ID field has been acquired.

Reception processor 40 is configured to manage the carrier sense information. This carrier sense information includes both Physical Carrier Sense information regarding busy/idle states of the medium (CCA) input from PHY processor 50 and Virtual Carrier Sense information on the basis of the medium reservation time described in the received frame. If either one of these carrier sense information pieces indicates the busy state, then the medium is regarded as being in the busy state in which transmission is prohibited. It is considered here that in IEEE 802.11 standard, the medium reservation time is described in Duration/ID field in the MAC header. MAC processor 10, when having received a MAC frame that is addressed to other wireless communication devices (that is not addressed to the device itself), determines that the medium is virtually in the busy state from the end of the physical packet including this MAC frame over the medium reservation time. A scheme of this type for virtually determining that a medium is in the busy state, or the term during which the medium is virtually regarded as being in the busy state is called Network Allocation Vector (NAV). It can be said that the medium reserved time represents the length of duration for which suppression of access to the wireless medium is instructed, i.e., the length of a period for which any access to the wireless medium is deferred.

Reception processor 40 manages access to a wireless medium on the basis of carrier sensing information. When a MAC frame is transmitted, a backoff algorithm is used on the basis of the carrier sensing information to determine the state of the wireless medium. If the wireless medium is in an idle state, an access right to access it is obtained, and the MAC frame is transmitted using transmission processor 30. Also, reception processor 40 executes EDCA (Enhanced Distributed Channel Access) which is priority control using access categories (ACs). According to EDCA, the minimum value of the contention window CWmin, the maximum value thereof CWmax, AIFSN (AIFS Number), and a TXOP limit (an upper limit value of TXOP) are defined for each AC as EDCA parameters. This embodiment is characterized, amongst others, by the fact that the control is implemented such that these parameters are changed in accordance with the history of UL-MU transmission or the specified enabled/disabled state of the capability of UL-MU transmission. The history of UL-MU transmission includes, by way of example, at least any one of: whether or not UL-MU transmission is executed; the number of times of execution of UL-MU transmission; an execution result indicating successful or unsuccessful UL-MU transmission; and an elapsed time from UL-MU transmission (e.g., an UL-MU transmission serving as the standard, or any UL-MU transmission carried out at a predetermined time point, etc.). It should be noted that the control of the EDCA parameters may be carried out by MAC/PHY manager 60 in place of reception processor 40, or may be carried out by another processing circuit within MAC processor 10. Details of EDCA and the EDCA parameters will be described later.

Here, the data frame may be a frame such that a plurality of MAC frames (i.e., MPDUs or sub-frames) are conjunct with each other or payload portions of a plurality of MAC frames are conjunct with each other. The former data frame is called A (Aggregated)-MPDU and the latter data frame is called A (Aggregated)-MSDU (MAC service data unit) in IEEE 802.11 standard. In the case of the A-MPDU, a plurality of MPDUs are conjunct with each other within the PSDU. Also, as a MAC frame, in addition to the data frame, the management frame and the control frame are also eligible for this conjunction. In the case of the A-MSDU, MSDUs which are a plurality of data payloads are conjunct with each other within the frame body of one MPDU. In both cases of the A-MPDU and the A-MSDU, partition information (length information, etc.) is stored in the frame such that the conjunction of the MPDUs and conjunction of MSDUs can be appropriately separated by the terminal on the reception side. Both of the A-MPDU and the A-MSDU may be used in combination. Also, the A-MPDU may involve not a plurality of MAC frames but one single MAC frame, and also in this case the partition information is stored in the frame. Also, when A-MPDU etc. is received, responses to the plurality of MAC frames being conjunctive are collectively transmitted. In such a case of the responses, a BA (BlockACK) frame is used instead of the ACK frame. In the following explanation and drawings, MPDU is used but A-MPDU or A-MSDU may be used instead.

According to IEEE 802.11 standard, several procedures are defined in multiple stages to be taken for a terminal that is not the base station to participate in a BSS (which is called Infrastructure BSS) configured with the base station amongst others and to perform exchange of data frames within the BSS. For example, there is provided a procedure called association, according to which an association Request frame is transmitted from the terminal that is not the base station to the base station to which the terminal requests the connection. The base station, after having transmitted an ACK frame for the association request frame, transmits an association Response frame which is a response to the association request frame.

The terminal stores the capability of the terminal itself in the association request frame and transmits this association request frame, and thus can make notification of the capability of the terminal itself to the base station. For example, the terminal may add, to the association request frame, a channel, a resource unit or both of them which is supported by the terminal itself, and information for identifying the standard supported by the terminal itself and transmit this association request frame. This information may be also set in the frame transmitted by the procedure called Reassociation to reconnect to another base station. In this procedure, a Reassociation Request frame is transmitted to the base station to which reconnection is requested from the terminal. The base station, after having transmitted the ACK frame in response to the reassociation request frame, transmits a reassociation response which is a response to the reassociation request frame.

As the management frame, a beacon frame, a probe response frame or the like may be used in addition to the association request frame and the re-association request frame. The beacon frame, which is basically transmitted by the base station, is capable of storing a parameter notifying the capability of the base station as such as well as the parameter(s) indicative of the attribute(s) of the BSS. In view of this, as the parameter for notifying the capability of the base station as such, the base station may also be configured to add information indicative of UL-MU supportability or indicative of whether this capability is enabled or disabled. Also, information on the supported rate of the base station may be notified as another parameter. The supported rate may include a mandatory rate that every terminal participating in the BSS formed by the base station has to support and an optional rate. The probe response frame is a frame transmitted in response to reception of a probe request frame from the terminal transmitting the beacon frame. Since the probe response frame is basically adapted for notification of the same content as that of the beacon frame, it is also possible to use the probe response frame for the base station to notify the capability of the base station as such to the terminal that has transmitted the probe request frame. By carrying out this notification to the UL-MU-compliant terminal, the terminal may carry out operation for example, such as enabling the function of UL-MU communications of the terminal itself.

It should be noted that the terminal may notify information on a rate that can be implemented by the terminal itself among the supported rates of the base station as the information for notification of the capability of the terminal itself to the base station. Meanwhile, with regard to the mandatory rate among the supported rates, it is assumed here that any terminal that is connected to the base station has the capability of implementing this mandatory rate.

It is considered here that if notification of some piece or pieces of information among the pieces of information mentioned above leads to definition of the content of another piece or other pieces of information, then notification of the other piece or pieces of information may be omitted. For example, suppose a case where a terminal is always an UL-MU compliant terminal if a capability that is compliant with a new standard or specifications is defined and as long as the terminal is compliant with that capability or specifications. In this case, notification of the fact that the terminal is an UL-MU compliant terminal may not need to be explicitly performed.

Figure 2:
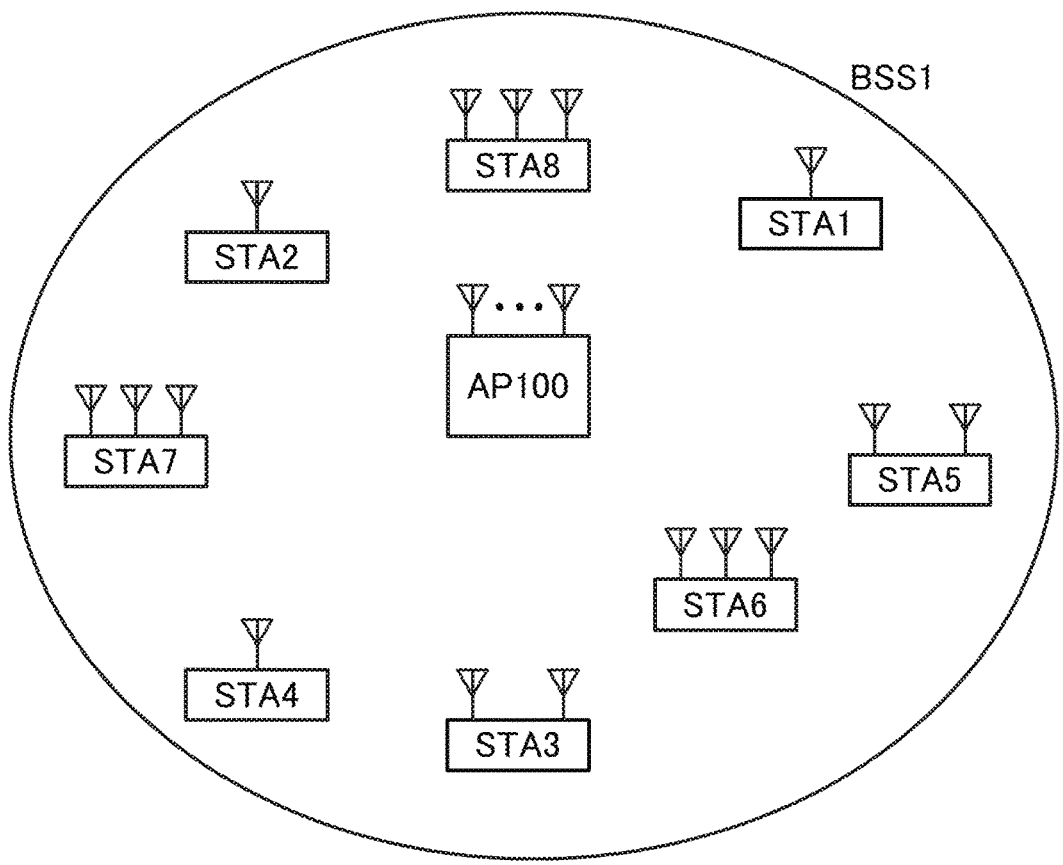
FIG. 2 is a diagram illustrating a wireless communication system including a base station a plurality of terminals.

FIG. 2 illustrates a wireless communication system in accordance with this embodiment. This system includes base station (AP: Access Point) 100 and multiple terminals (STAs: STAtions) 1 to 8. Base station 100 and terminals 1 to 8 serviced by base station 100 constitute basic service set (BSS) 1. This system is a wireless LAN system compliant with the IEEE802.11 standard using CSMA/CA (Carrier Sense Multiple Access with Collision Avoidance). Terminals 1 to 8 includes at least multiple UL-MU-compliant terminals (which may hereinafter be referred to as "HE (High Efficiency) terminals"), and may also additionally include other legacy terminals. The legacy terminals as used herein include a Non-HE terminal that supports QoS but does not support UL-MU and a Non-QoS terminal that supports neither QoS nor UL-MU. The legacy terminals specifically include terminals that support the IEEE802.11a/b/g/n/ac standards or the like. The UL-MU-compliant terminal is capable of carrying out UL-MU communications with base station 100 such as UL-MU-MIMO, UL-OFDMA, etc.

Figure 3:
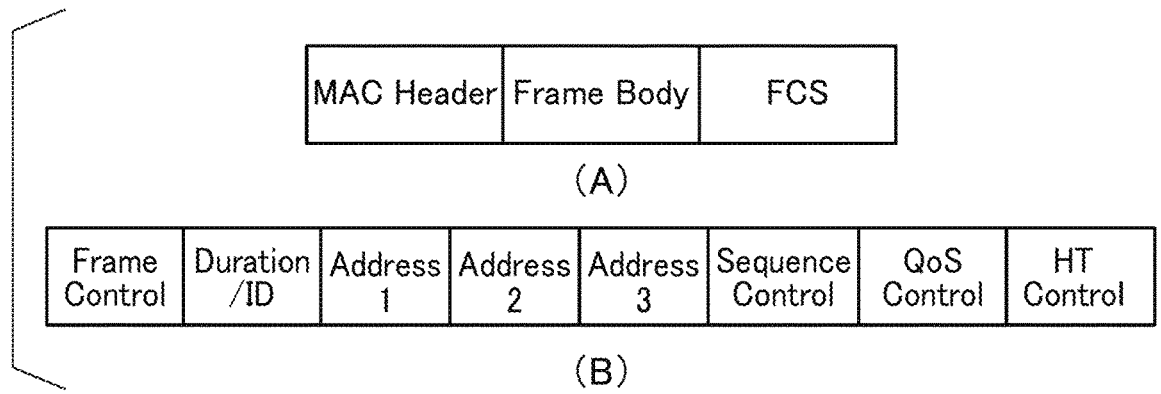
FIG. 3 is a diagram illustrating a basic exemplary format of a MAC frame.

FIG. 3 illustrates the basic exemplary format of the MAC frame. According to the present embodiment, a data frame, a management frame or a control frame is based on the frame format. This frame format includes the fields of MAC header, Frame body, and FCS. The MAC header includes, as illustrated in FIG. 3(B), the fields of Frame Control, Duration/ID, Address 1, Address 2, Address 3, Sequence Control, QoS Control, and HT (High Throughput) Control.

These fields do not need to always exist and there may be cases where some of these fields do not exist. For example, there may be a case where Address 3 field does not exist. Also, there may be other cases where both or either one of QoS Control field and HT Control field does not exist. Also, there may be still other cases where the frame body field does not exist. Also, any field or fields that are not illustrated in FIG. 3 may exist. For example, Address 4 field may further exist. In a case of a trigger frame as described later, a common information field and a terminal information field exist in the frame body field or the MAC header.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame.

Two fields of Type and Subtype or the like are set in Frame Control field. The rough classification as to whether it is the data frame, the management frame, or the control frame is made by the Type field, and more specific types, for example, fine discrimination among the roughly classified frames, for example, as to whether it is a RTS (Request to Send) frame, CTS (Clear to Send) frame, a BA (Block Ack) frame or a BAR (Block Ack Request) frame within the control frame is made by the Subtype field. The later described trigger frame may be discriminated by a combination of values of Type and Subtype. As one example, the trigger frame is classified into a control frame (Type indicate "control").

Duration/ID field describes the medium reserve time, and it is determined that the medium is virtually in the busy state from the end of the physical packet including this MAC frame to the medium reserve time when a MAC frame addressed to another terminal is received. The scheme of this type to virtually determine that the medium is in the busy state, or the period during which the medium is virtually regarded as being in the busy state, is, as described above, called NAV (Network Allocation Vector). QoS Control field is used to carry out QoS control to carry out transmission with the priorities of the frames taken into account. HT Control field is a field introduced in IEEE 802.11n. HT (High Throughput) control field is present when the Order field is set to 1 for QoS data frame or a management frame. As stated, HT Control field can be extended to a VHT (Very High Throughput) control field in IEEE 802.11ac or an HE (High Efficient) control field in IEEE 802.11ax which is a next-generation wireless LAN standard and can provide notifications corresponding to the functions of 802.11n, 802.11ac, or 802.11ax.

Figure 4:
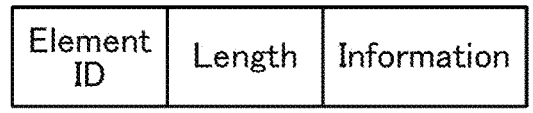
FIG. 4 is a diagram illustrating an exemplary format of an information element.

In the management frame, an information element (Information element; IE) to which a unique Element ID (IDentifier) is assigned is set in the Frame Body field. One or a plurality of information elements may be set after specific fields arranged depending on a kind of the management frame within the frame body field. The information element has, as illustrated in FIG. 4, the fields of Element ID field, Length field, and Information field. The information element is discriminated by the Element ID. The Information field is adapted to store the content of the information to be notified, and the Length field is adapted to store the length information of the information field.

Frame check sequence (FCS) information is set in FCS field as a checksum code for use in error detection of the frame on the reception side. As an example of the FCS information, Cyclic Redundancy Code (CRC) may be mentioned.

First Operation Example of this Embodiment

Figure 5:
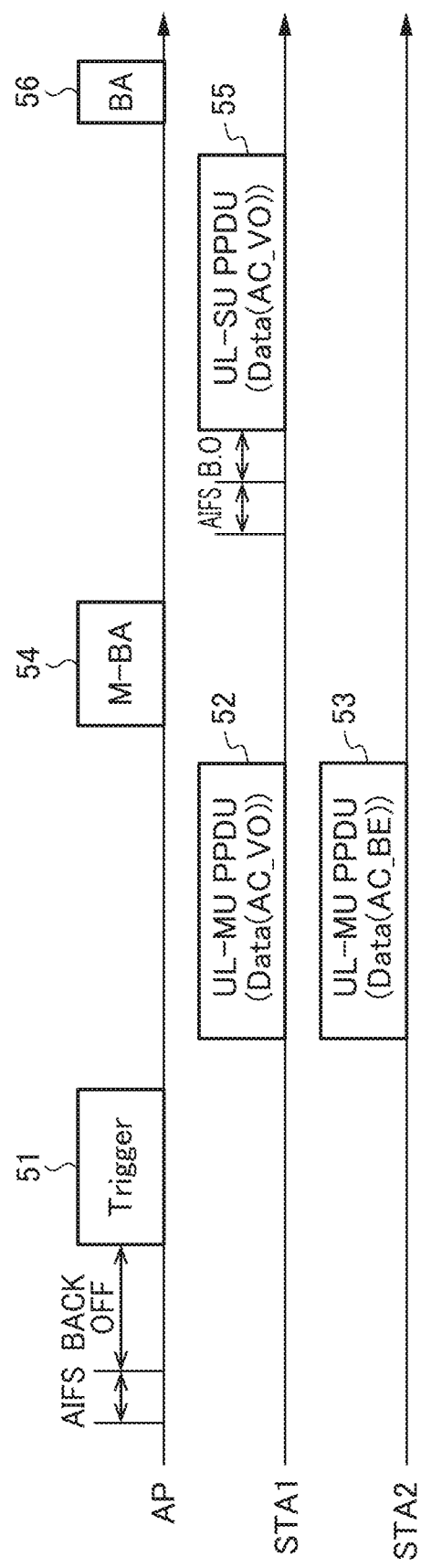
FIG. 5 is a diagram illustrating an example of sequence according to a first operation example of an embodiment of the present invention.

FIG. 5 illustrates a first exemplary operation sequence between base station (AP) 101 and terminals (STAs) 1 to 8 in accordance with this embodiment. In the figure, only terminal 1 and terminal 2 out of terminals 1 to 8 are illustrated. A case where terminals 1 to 4 are HE terminals, and terminals 5 to 8 are legacy terminals (Non-HE terminal or Non-Qos terminal) is considered.

As a premise, CSMA/CA-based individual communications (single-user communications) are carried out between the base station and all or part of terminals 1 to 8. In single-user communications, for example, communications are individually carried out between the base station and any one of the terminals using one channel with the basic channel width (e.g., 20 MHz). As an example of single-user communication, if a terminal has data for uplink transmission, the terminal obtains the access right to access a wireless medium in accordance with CSMA/CA. As a result, the terminal carries out carrier sensing during the carrier sensing time (waiting time). The carrier sensing time (waiting time) is the sum of DIFS/AIFS which is a fixed duration and a backoff duration randomly determined. If it has been determined that the medium (CCA) is idle, then the access right to access the medium is obtained. The terminal transmits a data frame including data to be transmitted (more specifically, a physical packet including the data frame). RA of data frame is a MAC address of the base station (i.e., BSSID) and TA is a MAC address of the terminal. When the base station normally receives this data frame, the base station returns an ACK frame which is an acknowledgement response frame (more specifically, a physical packet including the ACK frame) upon lapse of SIFS after receipt of the data frame. The terminal receives the ACK frame and thereby determines that the transmission of the data frame was successful. It should be noted that the data frame transmitted to the base station may be an aggregation frame (A-MPDU, etc.) and the acknowledgement response frame by which the base station makes a response may be a BA frame (this is also applicable to the following explanations).

Figures 6, 7, 8:
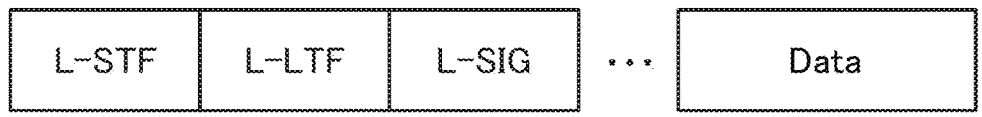
FIG. 6 is a diagram illustrating an exemplary format of a physical packet.
FIG. 7 is a diagram illustrating example values of EDCA parameters for each access category.
FIG. 8 is a diagram for explanation of changes in values of backoff counters of respective terminals.

DIFS/AIFS means either of the times DIFS and AIFS. When QoS is not supported, it denotes DIFS. When QoS is supported, it denotes AIFS determined in accordance with the access category (AC) of the data to be transmitted (which may hereafter be denoted as "AIFS[AC]"). The basic configuration of the physical packet is constituted by the MAC frame stored in the data field and a physical header added to the MAC frame. The physical header includes, by way of example, L-STF (Legacy-Short Training Field), L-LTF (Legacy-Long Training Field), and L-SIG (Legacy Signal Field) defined by the IEEE802.11 standard as illustrated in FIG. 6. L-STF, L-LTF, and L-SIG are fields that can be recognized, by way of example, by a terminal compliant with a legacy standard such as IEEE802.11a, each of which stores pieces of information such as signal sensing, frequency correction (channel estimation), and transmission rate. Fields other than those mentioned herein (e.g., a field that cannot be recognized by a legacy-standard terminal but can be recognized by an UL-MU-compliant terminal) may be included. For example, HE-SIG-A (and HE-SIG-B), HE-STF, and HE-LTF discussed in IEEE802.11ax may be included.

Here, the above-described backoff duration is obtained by multiplying (i) an integer randomly selected from a contention window (CW) given as an integer which is 0 or greater by (ii) slot time (e.g., 9 μs). The initial value of CW is its minimum value (CWmin). The value of CW is incremented stepwise every time re-transmission occurs until it reaches its maximum value (CWmax). Both of CWmin and CWmax take values for each AC (access category) in the same manner as AIFS.

As the priority control scheme using ACs, EDCA (Enhanced Distributed Channel Access) may be mentioned. EDCA is briefly described. In a wireless LAN network compliant with the IEEE802.11 standard, when data is passed from an upper layer (LLC layer, etc.) to the MAC layer and the terminal supports QoS (Quality of Service), then a traffic type (TID) is notified along with the data. According to the existing standards, terminals supporting IEEE802.11n and IEEE802.11ac support QoS as well.

The data is classified into four ACs, for example, on the basis of the traffic types. By way of example, TID takes a value in the range from 0 to 15, of which 0 to 7 are used by a terminal (which may include the base station) in an EDCA environment whilst 8 to 15 are used by a terminal (which may include the base station) in hybrid coordination function (HCF) controlled channel access (HCCA) environment or an HEMM (HCCA, EDCA mixed mode) environment. Here, the EDCA environment is considered, where data is classified into any one of the four ACs in accordance with the TID taking a value from any one of the values 0 to 7. BACKGROUND (AC_BK), BEST EFFORT (AC_BE), VIDEO (AC_VI), and VOICE (AC_VO) are defined as the types of AC. The individual ACs have their respective priorities in the order of AC_BK, AC_BE, AC_VI, and AC_VO which has the highest priority. Transmission buffers (transmission queues) are provided for the four respective ACs. The sorted pieces of data are stored in the corresponding one of the transmission buffers. The transmission buffer may be a memory device, an SSD, a hard disk, or the like. If the transmission buffer is a memory device, then the memory device may be volatile memory such as DRAM and SRAM or non-volatile memory such as NAND and MRAM.

Multiple EDCA parameters are defined for each AC. The difference in the priority of medium access at the time of transmission is determined by the parameters. As examples of the parameters, CWmin, CWmax, AIFSN, TXOP limit (Max TXOP), and the like may be mentioned. CWmin and CWmax are the minimum value and the maximum value of CW, respectively. AIFSN is AIFS Number and corresponds to the time length of AIFS. The TXOP limit represents the upper limit value (maximum value) of the TXOP that can be acquired. AIFSN, CWmin, and CWmax are specified so that they take smaller values for ACs having higher priority of medium access. In contrast, the TXOP limit tends to be specified as a larger value for an AC having higher priority of medium access, but AC_VI basically takes a larger value than AC_VO. This is because the characteristics of the traffic types are taken into account.

FIG. 7 illustrates exemplary EDCA parameters for each access category. If QoS is not supported (if the terminal is a Non-QoS terminal), the access category is denoted by "Legacy DCF (Distributed Coordination Function)" for the sake of explanation. DCF is an access scheme which is similar to EDCA but does not have the concept of QoS control (AC-based priority control). If the value of Max TXOP (TXOP limit) is 0, it means that only one frame (more specifically, one MSDU) can be transmitted. The values of the EDCA parameters of FIG. 7 are default values, and the values of the EDCA parameters can also be specified in advance for each base station (BSS). According to this embodiment, the illustrated default EDCA parameter values or the EDCA parameter values specified in advance by the base station are called "normal EDCA parameter value." For example, the illustrated TXOP limit value may be called "normal TXOP limit value."

In an EDCA environment, the procedures for CSMA/CA-based data transmission in the terminals (HE terminal(s) and QoS terminal(s)) are carried out independently for each AC that has the data for transmission. Specifically, carrier sensing is carried out for each AC during the waiting time including AIFS[AC] in accordance with the type of AC and the backoff duration. An AC whose waiting time has become 0 first acquires the access right. If there are multiple ACs whose waiting times have become 0 simultaneously, then the AC with higher priority of medium access acquires the access right. With regard to Non-QoS terminals, as has been described in the foregoing, carrier sensing is carried out during the waiting time including DIFS and the backoff duration, and, when it has been determined that the medium (CCA) is idle until the end of the waiting time, the access right to access the medium is acquired.

It is assumed in FIG. 5 that the base station holds UL-MU trigger frame 51 in the transmission buffer. Trigger frame 51 includes pieces of information specifying multiple terminals for UL-MU transmission, pieces of information on various parameters used by the respective terminals in UL-MU transmission, and other pieces of information. Pieces of information on the resources used in UL-MU transmission, piece of information on the transmission packet length, and pieces of information on transmission power, etc. may be mentioned as an example of the parameter information. Also, it may be a piece of information that specifies or recommends the AC of the data transmitted by UL-MU transmission. Some pieces of the information on the parameters may be individually specified on a per-terminal basis whilst other pieces thereof may be commonly specified for multiple terminals. RA specified in the MAC header is, by way of example, a broadcast address or a multicast address. TA is a MAC address of the base station (BSSID). The exemplary format of the trigger frame will be described later.

Also, terminal 1 holds data of AC_VO (the access category is Voice) and terminal 2 holds data of AC_BE (the access category is Best Effort) in their transmission buffers of the corresponding ACs. It is assumed here that the base station, terminal 1, and terminal 2 do not hold data with regard to ACs other than those mentioned above. It is also assumed here that the EDCA parameter applied to the trigger frame is identical to the value of the parameter of VO (Voice) which is an AC having the highest priority. However, the same value as the parameter of another AC may be used as the trigger frame and it is also possible to separately define the value for the trigger frame.

The base station, terminal 1, and terminal 2 carry out carrier sensing during the waiting times which is a sum of AIFS[AC] in accordance with their respective AC and the backoff duration. The base station, terminal 1, and terminal 2 all continue to carry out carrier sensing without sensing a carrier and with the lapse of AIFS[AC] and during the subsequent backoff duration. FIG. 8(A) illustrates an example of the value of the backoff counter at a time point (given as t1) of the backoff duration. At the time point t1, the backoff counter (AC_CW) of the base station indicates 3, the backoff counter (EDCA_CW_VO) of terminal 1 indicates 4, and the backoff counter (EDCA_CW_BE) of terminal 2 indicates 15. Accordingly, after that, it can be seen that the backoff counter of the base station first becomes 0.

When the backoff counter of the base station becomes 0 without any carrier being sensed, in other words, when the backoff duration has elapsed, then the base station acquires the access right to access the wireless medium and transmits trigger frame 51. More specifically, a physical packet formed by adding a physical header to trigger frame 51 is transmitted. The trigger frames 51 are received by terminal 1 and terminal 2, respectively (and by not-shown other terminals). Terminal 1 and terminal 2 determine that a carrier has been sensed by receipt of a signal carrying trigger frame 51 and stop the backoff operation. In other words, the backoff counters of terminal 1 and terminal 2 are stopped. The values of the respective backoff counters of the base station, terminal 1, and terminal 2 at this time point (given as t2) are illustrated in FIG. 8(B). The base station has the counter value 0, terminal 1 has the counter value 1 (=4−3), and terminal 2 has the counter value 12 (=15−3).

When terminal 1 and terminal 2 which received trigger frame 51 sense the fact that the terminal itself is specified in trigger frame 51, they read data from the transmission buffers of the corresponding ACs and generate a data frame including the data. In addition, they transmit, by UL-MU transmission, physical packets (PPDU) 52, 53 formed by adding a physical header to this data frame upon the lapse of the duration specified in advance after completion of receipt of trigger frame 51. When a common physical packet length (PPDU length) is specified for multiple terminals by the trigger frame, terminal 1 and terminal 2 generate a physical packet having the specified length. When the packet length to be generated is shorter than the specified length, then the physical packet length is adjusted by adding thereto padding data at its tail.

The duration that has been defined in advance may be identical to SIFS or a value larger than that. UL-MU is, by way of example, UL-MU-MIMO, UL-OFDMA, or a scheme configured by both of them in combination (UL-MU-MIMO&OFDMA). Which scheme should be used may be determined in advance by BSS or may be specified by the trigger frame.

The base station that received physical packets 52, 53 transmit acknowledgement response frame 54 upon lapse of the predetermined duration (SIFS, etc.) after completion of receipt of these physical packets. Here, as the acknowledgement response frame, Multi-STA BA frame (hereinafter referred to as "M-BA frame") 54 aggregating acknowledgements to terminal 1 and terminal 2 is transmitted. The exemplary format of the M-BA frame will be described later. Methodology of acknowledgement response other than transmission of the M-BA frame may be used. For example, ACK frames (or BA frames) may be transmitted by single-user transmission sequentially to terminal 1 and terminal 2. Alternatively, ACK frames (or BA frames) may be transmitted by DL-MU transmission to terminal 1 and terminal 2. DL-MU is, by way of example, DL-MU-MIMO, DL-OFDMA, or a scheme configured by both of them in combination (DL-MU-MIMO&OFDMA).

Terminal 1 and terminal 2 that received M-BA frame 54 confirms the information addressed to the terminal itself included in M-BA frame 54 and thereby checks whether or not transmission of the data frame is successful. When terminal 1 and terminal 2 determines that the transmission failed, they determine to re-transmit the relevant data frame at or after the next opportunity to do so. Here, a case is considered where terminal 1 and terminal 2 both succeeded in their transmissions.

After transmission of M-BA frame 54, it is supposed that the base station does not have data or frame it wants to transmit and terminal 1 and terminal 2 still hold data in the transmission buffers of the same ACs as that of the data that was previously transmitted, respectively. In other words, it is assumed here that terminal 1 and terminal 2 transmit by UL-MU transmission the data that was the target of acquisition of the access right by the carrier sensing prior to reception of trigger frame 51 and that they still have the data for transmission in the transmission buffers of the same ACs, respectively.

As a result, terminal 1 and terminal 2 start carrier sensing upon lapse of a predefined duration (SIFS, etc.) after completion of receipt of the M-BA frame. Specifically, terminal 1 and terminal 2 carries out carrier sensing during the waiting times which is the sum of their respective AIFS[AC] and the backoff duration. At this point, the time indicated by the value of the backoff counter at the time of stoppage in reception of the signal of trigger frame 51 (see FIG. 8(B)) is used as the backoff duration. Accordingly, for both of terminal 1 and terminal 2, the value of the backoff counter at the time point of lapse of AIFS[AC] becomes the value of FIG. 8(B). Accordingly, it can be seen that, after that, the backoff counter of terminal 1 first becomes 0.

When the backoff counter indicates 0 without any carrier being sensed by terminal 1, in other words, when the backoff duration has elapsed, terminal 1 reads data from the transmission buffer of the relevant AC, generates a data frame, and transmits physical packet (PPDU) 55 including the generated data frame. The terminal, when generating the data frame, determines TXOP within the range defined by the TXOP limit value of the relevant AC (see FIG. 7), and specifies a value obtained by subtracting the packet length from this length in Duration/ID field of the MAC header. If only one frame is to be transmitted (only the transmission of this round), a predetermined value (e.g., 0) should be specified.

Physical packet 55 is received by the base station and an acknowledgement response frame is transmitted to terminal 1 upon lapse of SIFS after completion of receipt of physical packet 55. In the illustrated example, BA frame 56 is transmitted. Meanwhile, if the transmitted data frame is not A-MPDU, it may be an ACK frame. Terminal 2 determines that a carrier has been sensed by reception of a signal carrying physical packet 55, and stops the backoff operation. In other words, the backoff counter of terminal 2 is stopped. The values of the respective backoff counters of terminal 1 and terminal 2 at this time point (given as t3) are illustrated in FIG. 8(C). Since no frame to be transmitted exists in the base station, the backoff counter does not exist (in the figure, this fact is notated by "No Frame"), the backoff counter of terminal 1 indicates 0, and the backoff counter of terminal 2 indicates 11 (=12−1).

The sequence is thereafter continued in the same or similar manner. Terminal 2 continues to use the backoff counter value at the time point t3 in the next round of carrier sensing. If terminal 1 has further data to be transmitted, terminal 1 randomly selects a new value from CW in accordance with the relevant AC and calculates the backoff duration.

In the above-described sequence, terminal 1 and terminal 2 both succeed in the UL-MU transmission. Meanwhile, the value of the backoff counter may be used on an as-is basis even in a case where they failed in the UL-MU transmission. In normal cases, when it is not successful, the value of the backoff counter is obtained again according to EDCA. At this point, the value of CW for selecting the backoff counter is incremented stepwise every time the failure occurs until it reaches the maximum value (CWmax). This normal operation may be applied. Alternatively, as a variant example, when UL-MU transmission was not successful, the value of the backoff counter may be used on an as-is basis, and, when it was successful, a new backoff duration may be determined.

In the above-described sequence, the AC that was the target of the backoff operation prior to reception of the trigger frame and the AC that has become the target of UL-MU transmission are one and the same AC. However, there may be a case where these ACs are different from each other. For example, in some cases, the AC that was recommended or specified by the trigger frame is different from the AC that was the target of the backoff operation. In this case as well, a backoff counter value of the backoff counter stopped at the time of reception of the trigger frame may be used on an as-is basis for the backoff operation for the next round of SU transmission. It should be noted that, when the AC is specified in the trigger frame, the terminal transmits data pertaining to the relevant AC and, if there is no data pertaining to the relevant AC in transmission buffer, then UL-MU transmission may not be performed or a frame including notification of the fact that no data exists may be transmitted. If AC is recommended by the trigger frame, data pertaining to the relevant AC is transmitted to the extent possible. For example, if data pertaining to the recommended AC exists in the transmission buffer, this data is transmitted. If it does not exist, data pertaining to other ACs may be transmitted.

The backoff counter values of the respective ACs at the time of stoppage upon receipt of the trigger frame may be used on an as-is basis in the next round of the backoff operation in the same or similar manner in a case where there are multiple ACs which were the targets of the backoff operation prior to reception of the trigger frame and one of them is an AC that was the target of UL-MU transmission.

The trigger frame specifies multiple terminals for UL-MU transmission. Meanwhile, without specifying the terminals, a trigger frame may be used according to which terminals randomly selects a resource from the resources (e.g., in the case of OFDMA, resource units) random access to which has been permitted and the terminals are allowed to carry out UL-MU transmission (carry out random access). Such a trigger frame may be called "Trigger Frame For Random Access" (TF-R). In this case, in the flowchart of FIG. 9, the determination regarding whether or not the terminal itself is specified by the trigger frame (S13 of FIG. 9) should be substituted by the determination on the side of the terminals regarding whether or not the terminals should carry out random access. In addition, when the random access is carried out, the process should proceed to the step S14 of FIG. 9. The terminal that received TF-R selects the resource on the basis of a method similar to the random backoff method. For example, the selection of the resource is carried out such that the selection right is given when the value obtained by subtracting the number of resources to which random access has been permitted from a random backoff counter value randomly selected in advance becomes equal to or lower than 0. If it is larger than 0, the random access of this round is deferred, and presence or absence of the selection right is determined at the time of the next round of TF-R reception using the random backoff counter value after the subtraction in the same or similar manner. Details of TF-R and random access will be described later.

Figure 9:
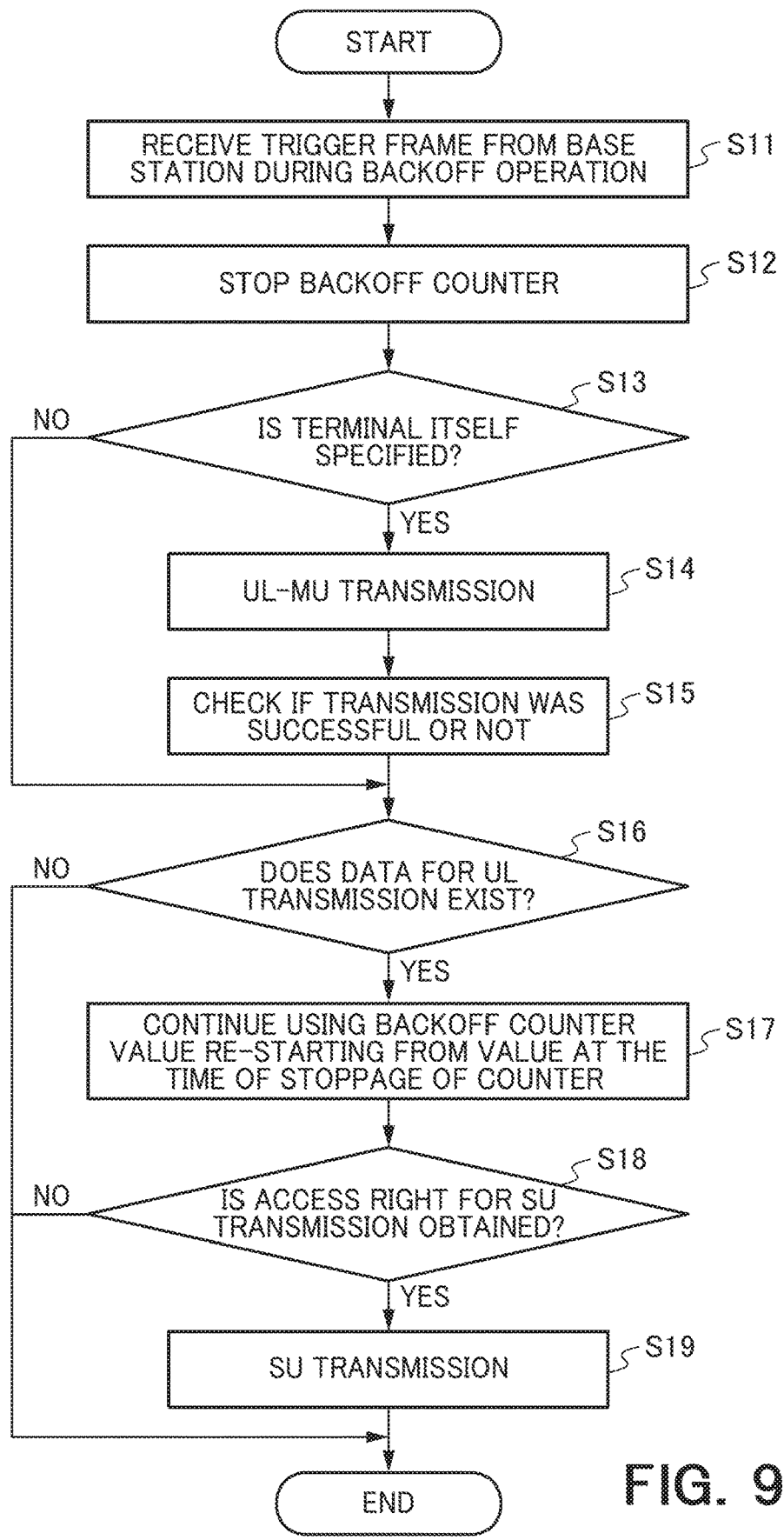
FIG. 9 is a diagram illustrating a flowchart of an exemplary operation of a terminal according to the first operation example of an embodiment of the present invention.

FIG. 9 is a flowchart of the operation of the terminal according to the first operation example of this embodiment.

When the terminal receives the trigger frame from the base station at the time of the backoff operation (S11), the terminal stops the backoff operation, i.e., stops the backoff counter (S12). The backoff counter value at this point is maintained on an as-is basis. In other words, the backoff counter value at this point is stored in the storage device. The terminal determines on the basis of the trigger frame whether or not the terminal itself is specified for UL-MU (S13). If the terminal itself is specified (YES), the terminal reads data from the transmission buffer of the relevant AC, generate a data frame including this data, and transmits a physical packet including this data frame by UL-MU transmission upon lapse of a predetermined duration after completion of receipt of the trigger frame (S14). As has been described in the foregoing, the AC for which data is to be read may be an AC that was the target of the backoff operation or any other ACs different than that. Although both cases are possible, a case of the same AC is considered here.

The terminal receives, after UL-MU transmission, an acknowledgement response frame (M-BA frame, etc.) transmitted from the base station, examines the acknowledgement response frame, and thereby determines whether or not UL-MU transmission has been successful (S15). If any data whose transmission failed exists, the terminal decides to re-transmit this data at or after the opportunity of the next round of transmission (UL-MU transmission or SU transmission).

If the terminal itself was not specified by the trigger frame (NO in S13), or if data the terminal wants to transmit by UL transmission remains to exist after UL-MU transmission (YES in S16), then the terminal carries out carrier sensing in order to acquire the access right for SU transmission. The carrier sensing is carried out during the waiting time which is the sum of AIFS[AC] which is a fixed duration and the backoff duration in accordance with the EDCA parameters of the relevant AC. At this point, the backoff counter value at the time of stoppage in the step S12 is used as the backoff duration (S17). The terminal acquires the access right to access the wireless medium if there is no carrier sensed during the carrier sensing (YES in S18). When the terminal was able to acquire the access right, the terminal reads data from the transmission buffer of the relevant AC, generates a data frame, and transmits by SU transmission the physical packet including the data frame (S19). It should be noted that, in the above-described exemplary sequence, terminals 3 and 4 (HE terminals) corresponds to the terminals for which the terminal themselves were not specified in the trigger frame in the step S13. When terminals 5 to 8 (legacy terminals) stopped the backoff operation due to reception of trigger frame 51 or the like, they thereafter should continue to use the value of the last backoff counter as the backoff duration in the carrier sensing on an as-is basis until they succeed in SU transmission.

As described above, when the trigger frame is received during the backoff operation, the backoff counter is stopped, and the counter value at the time of the stoppage is used on an as-is basis for the backoff operation for single-user (SU) transmission to be carried out after the UL-MU transmission. In general operation, a new value is randomly selected from CW at the time of the next round of SU transmission and the backoff duration is calculated. Meanwhile, according to this embodiment, since the value of the backoff counter that stopped at the time of reception of the trigger frame is re-used, it is made possible to avoid wasting the backoff operation that has been carried out up to the time of the trigger frame reception. Although the problem of fairness in terms of use of wireless media exists between the terminal that carried out UL-MU transmission and the remaining terminals, it is made possible to prevent wasting the backoff operation of the terminal that carried out UL-MU transmission when UL-MU transmission is to be carried out in the EDCA environment.

Second Operation Example of this Embodiment

Figure 10:
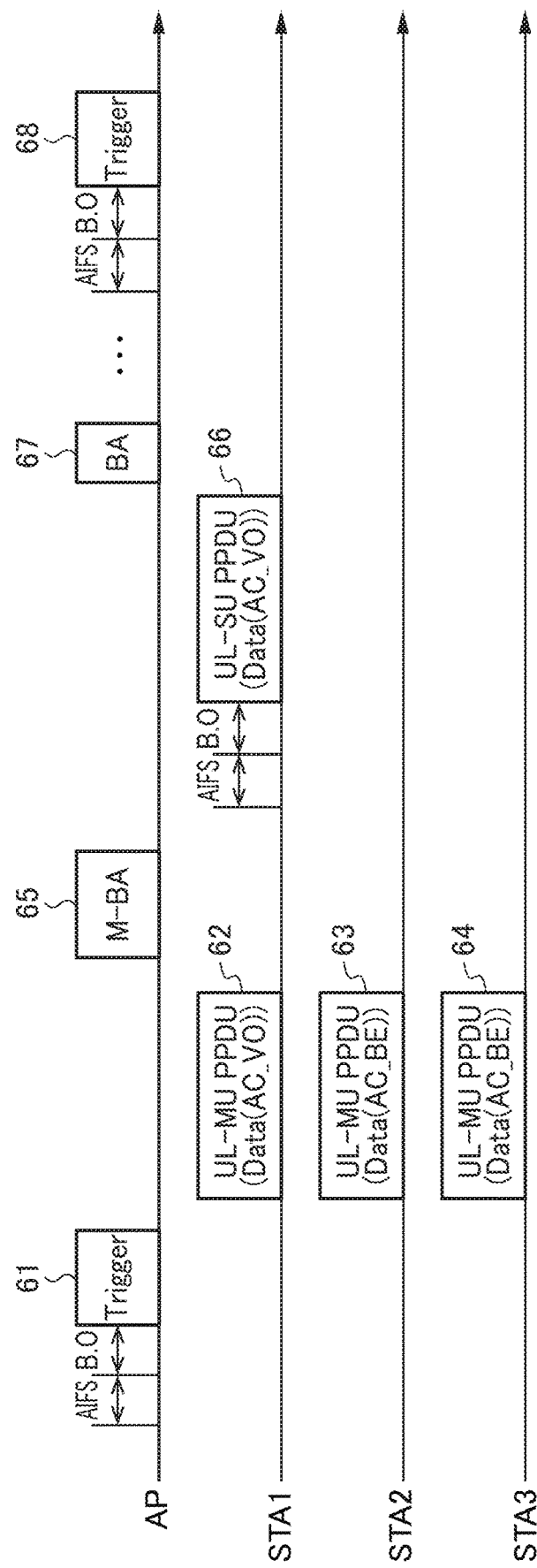
FIG. 10 is a diagram illustrating an example of sequence according to a second operation example of an embodiment of the present invention.

FIG. 10 illustrates a second example of the operation sequence between base station (AP) 101 and terminals (STAs) 1 to 8 according to this embodiment. This sequence is characterized by the fact that the terminal controls and changes the value of the TXOP limit, which is one of the EDCA parameters, in accordance with a history of UL-MU transmission, and determines the TXOP at the time of SU transmission using the changed value. Control of the value of the TXOP limit may be carried out by either MAC processor 10 or MAC/PHY manager 60 of FIG. 1.

In the following explanation, an example is illustrated where the value of the TXOP limit is decremented when the history of UL-MU transmission satisfies a predefined change condition. The change condition demands that a predetermined duration has not yet lapsed from the predefined time point when the terminal itself is specified by the trigger frame and that the UL-MU transmission has been successful. If the change condition is satisfied, the value of the TXOP limit is decremented. If the change condition is not satisfied, the normal TXOP limit value (the default value of FIG. 7) is used.

It should be noted that only terminals 1, 2, and 3 are illustrated in the figure from among terminals 1 to 8. It is assumed here that terminals 1 to 4 are HE terminals, and terminals 5 to 8 are legacy terminals (Non-HE terminal or Non-Qos terminal).

Referring to FIG. 10, the base station holds UL-MU trigger frame 61 in the transmission buffer. Also, terminal 1 holds data of AC_VO (the access category is "Voice"), and terminals 2 and 3 hold data of AC_BE (the access category is "Best Effort") in their respective transmission buffers of the relevant ACs, respectively. It is assumed here that none of terminals 1 to 3 hold data of ACs other than those mentioned above. The value of the EDCA parameter applied to the trigger frame is the same as the value of the EDCA parameter of AC_VO.

The base station and terminals 1 to 3 carries out carrier sensing during the period equal to the sum of AIFS[AC] and the backoff duration. A state is considered where AIFS[AC] elapses without any carrier being sensed by any one of the base station and terminals 1 to 3 and carrier sensing is continued in the subsequent backoff duration.

It is supposed here that the backoff counter of the base station first becomes 0. The base station acquires the access right to access a wireless medium and transmits trigger frame 61. More specifically, a physical packet obtained by adding a physical header to trigger frame 51 is transmitted. Information specifying terminals 1 to 3 is specified in trigger frame 61, and parameters (resource to be used, packet length, transmission power, etc.) for UL-MU is specified therein for terminals 1 to 3. Trigger frame 61 is received by terminals 1 to 3 (and other not-shown terminals). Terminals 1 to 3 determine that a carrier has been sensed by reception of the signal of trigger frame 61 and stop the backoff operation (stop the backoff counter). The value of the backoff counter at the time of the stoppage is stored.

Terminals 1 to 3 that received trigger frames 61 analyze trigger frames 61 and detect the fact that the terminals themselves are specified. Terminals 1 to 3 set their respective timers to specify a predetermined time length and activate the timers at or after the time point of completion of receipt of trigger frames 61, for example, after a fixed time, or alternatively, at the time point of completion of UL-MU transmission by the terminal itself. Here, it is supposed that terminals 1 to 3 have activated the timer at the time point of completion of receipt of trigger frame 61. It is assumed here that the value of the duration specified to the timer is the transmission period of the trigger frame. In this example, it corresponds to a length of the duration (time length) from completion of transmission of trigger frame 61 to start of transmission of the next trigger frame (trigger frame 68 in the figure) or a time length to which a redundant value is added such that the transmission of the next trigger frame is sufficiently covered. The predetermined duration is not limited to those described herein, and may be any appropriate duration longer or smaller than them. For example, it may be a time length up to the transmission of the next beacon frame, or may be defined as being an integral multiple of, for example, twice as large as the transmission period of the trigger frame. If the time point at which the timer is activated arrives after completion of receipt of trigger frame 61, then the time length to be specified for the time may be adjusted in accordance with that. The value specified to the timer may be defined in advance or may be determined by the base station and the information on the value may be notified to the individual terminals. The notification may be performed using the trigger frame or a frame (beacon frame) other than that or the like may be used.

It should be noted that the first activation of the timer may be performed at the time point at which the terminal itself decided to carry out UL-MU transmission, or the time point at which the UL-MU transmission request is notified to the base station using the management frame or using the header of the QoS data frame.

Terminals 1 to 3 read data from the transmission buffer of the relevant AC, generate a data frame, and transmit by UL-MU transmission physical packets 62 to 64, respectively, which are obtained by adding a physical header to the data frame after a predefined fixed duration after completion of receipt of trigger frame 61. The predefined duration may be SIFS or any value larger or smaller than SIFS.

The base station that received physical packets 62 to 64 transmits acknowledgement response frames 65 upon lapse of a predefined duration (SIFS, etc.) after completion of receipt of these packets. Here, as the acknowledgement response frame, M-BA frame 65 that aggregates acknowledgements to terminals 1 to 3 is transmitted. As has been described in the context of the first operation example of this embodiment, any methodology may be used other than transmission of the M-BA frame as the method of acknowledgement.

Terminals 1 to 3 that received M-BA frame 65 checks whether or not transmission of the data frame was successful by confirming the information addressed to the terminal itself included in M-BA frame 65. Here a case is considered where terminals 1 to 3 all succeeded in their transmissions. If it has been determined that the transmission was not successful, it is determined to re-transmit the data whose transmission was not successful. The terminal that failed in the transmission may refrain from (re-)activating the timer by trigger frame 61 or continue the operation of the timer on an as-is basis. In order for the terminal that failed in the transmission to not activate the time by trigger frame 61, for example, it is checked whether there exists acknowledgement response frame 65 to be transmitted upon lapse of the fixed duration after UL-MU transmission, or whether or not acknowledgement response frame 65 includes at least an acknowledgement response related to UL-MU transmission of the terminal itself, based on which it is determined whether or not the timer should be activated. It is assumed here that the timer is made to continue its operation.

It is further supposed that, after that, the base station does not internally hold any frame to be transmitted while terminals 1 to 3 continue to hold data for transmission in their respective transmission buffers of the same ACs as that of the data frame transmitted by physical packets 62 to 64, respectively.

Terminals 1 to 3 start carrier sensing for SU transmission of the data that they hold upon lapse of a predefined duration (SIFS, etc.) after completion of receipt of the M-BA frame. Specifically, terminals 1 to 3 carry out carrier sensing during the waiting times which are the sum of AIFS[AC] and the backoff duration. At this point, as the backoff duration, in the same or similar manner as in the above-described first operation example, the backoff counter value at the time of stoppage upon receipt of trigger frame 61 may be used. Meanwhile, this is merely an example of the operation and terminals 1 to 3 may determine new backoff durations from CW.

It is supposed here that the backoff counter terminal 1 from among terminals 1 to 3 becomes 0. Terminal 1 reads data from the transmission buffer of the relevant AC, generates a data frame, and transmits physical packet (PPDU) 66 obtained by adding a physical header to this data frame. In generation of the data frame, TXOP is determined within the range defined by the TXOP limit value of the relevant AC and a value obtained by subtracting the packet length from the determined length is specified in Duration/ID field of the MAC header. If only one frame is to be transmitted (only the transmission of this round), a predetermined value (e.g., 0) should be specified. At this point, the timer of terminal 1 does not time out, terminal 1 determines that the change condition is satisfied. Accordingly, terminal 1 uses a TXOP limit value (second TXOP limit value) which is made smaller than a normal value (the default value of Max TXOP of FIG. 7) as the TXOP limit value of the relevant AC to determine TXOP.

By way of example, the TXOP limit (first TXOP limit) prior to change of the relevant AC is given as "Old_Max_TXOP" and the TXOP limit (second TXOP limit) after change of the relevant AC is given as "NEW_Max_TXOP," then the change is carried out in accordance with the following expression (Expression 1). "×" indicates multiplication. α is a coefficient not less than 0 but less than 1.

$$\text{NEW\_Max\_TXOP}_{per\ AC} = \alpha \times \text{Old\_Max\_TXOP}_{per\ AC} \quad \text{(Expression 1)}$$

Terminal 1 determines the TXOP within the range not larger than NEW_Max_TXOP$_{per\ AC}$, and specifies a value corresponding to the determined duration in Duration/ID field of the MAC header of the data frame transmitted by physical packet 66. Specifically, a value obtained by subtracting the packet length (PPDU length) of physical packet 66 from the determined TXOP is specified in Duration/ID field. It should be noted that, if α is 0, the second TXOP limit value will be 0, which means, as has been described above, that only one frame can be transmitted.

As another example of calculation of the second TXOP limit, the packet length (PPDU length) of physical packet 62 transmitted by UL-MU may be subtracted from the first TXOP limit value. Alternatively, a value that depends from the physical packet length (e.g., a value that becomes larger or shorter as the packet length becomes longer or shorter) may be subtracted from the first TXOP limit value.

The base station that received physical packet 66 transmits acknowledgement response frame 67 (more specifically, a physical packet obtained by adding a physical header to acknowledgement response frame 67) upon lapse of a predefined duration (SIFS, etc.) after completion of receipt thereof. Here, an aggregation frame is carried as the data frame by physical packet 66 and a BA frame is transmitted as the acknowledgement response frame.

Terminal 1 that received BA frame 67, if it is within the TXOP, may continue reading data from the transmission buffer of the relevant AC, generating a data frame, and transmitting this physical packet including the data frame. At this point, a value in accordance with the remaining time of the TXOP is specified in Duration/ID field of the MAC header of the data frame. For example, a value obtained by subtracting SIFS and the packet length of the physical packet transmitted this time from the value specified in Duration/ID field of the MAC header of BA frame 67 may be specified. Alternatively, a value obtained by subtracting a length of the duration (the time length) from the time point of completion of transmission of physical packet 66 to start of the physical packet of this round and the packet length of the physical packet transmitted this time from the value specified in Duration/ID field by physical packet 66 may be specified.

Thereafter, if it is within the TXOP, terminal 1 can repeatedly carry out transmission of the physical packet including the data frame and reception of the acknowledgement response frame with the interval of SIFS.

It is supposed here that, after end of the TXOP, prior to reception of trigger frame 68, and in a state where, the timer is yet to be timed out, terminal 1 further carries out carrier sensing for transmission of data pertaining to the relevant AC, and, determining that the result of carrier sensing is idle, acquires the access right. The above-described second TXOP limit may continue to be used as the TXOP limit value used at this point. Alternatively, the second TXOP limit value may be regarded as $\alpha \times Old\_Max\_TXOP_{per\ AC}$ and applied to Expression 1, and a value that is made further smaller may be calculated. At this point, the value of a may be fixed or made smaller or larger every time the TXOP limit is updated.

If the timer has timed out, terminal 1 determines that the change condition is not satisfied and restores the value of the TXOP limit to the first TXOP limit value (normal TXOP limit value). When the terminal itself is specified again by trigger frame 68, it activates the timer again and determines that the change condition has been satisfied. If terminal 1 has acquired the access right of SU transmission while the timer is activated (before the timeout), terminal 1 lowers the TXOP limit value for use in the SU transmission. When the terminal itself is specified again by trigger frame 68 before the timer activated by trigger frame 61 times out then the terminal resets the timer (time-out time is restored to the initial value) and activates the timer.

In the above-described sequence, explanations have been provided based on an example where terminal 1 succeeded in acquiring the access right in carrier sensing of SU transmission. Meanwhile, the same or similar operation is also carried out in a case where terminal 2 or 3 acquired the access right.

Since terminal 4 is not specified by the trigger frame 61, terminal 4 determines the TXOP using the first TXOP limit value (normal TXOP limit value) when generating data frame for SU transmission. Terminals 5 to 8 (legacy terminals) likewise determine the TXOP using the first TXOP limit value (normal TXOP limit value) when generating the data frame for SU transmission. According to this embodiment, a legacy terminal uses the normal TXOP limit value.

Figure 11:
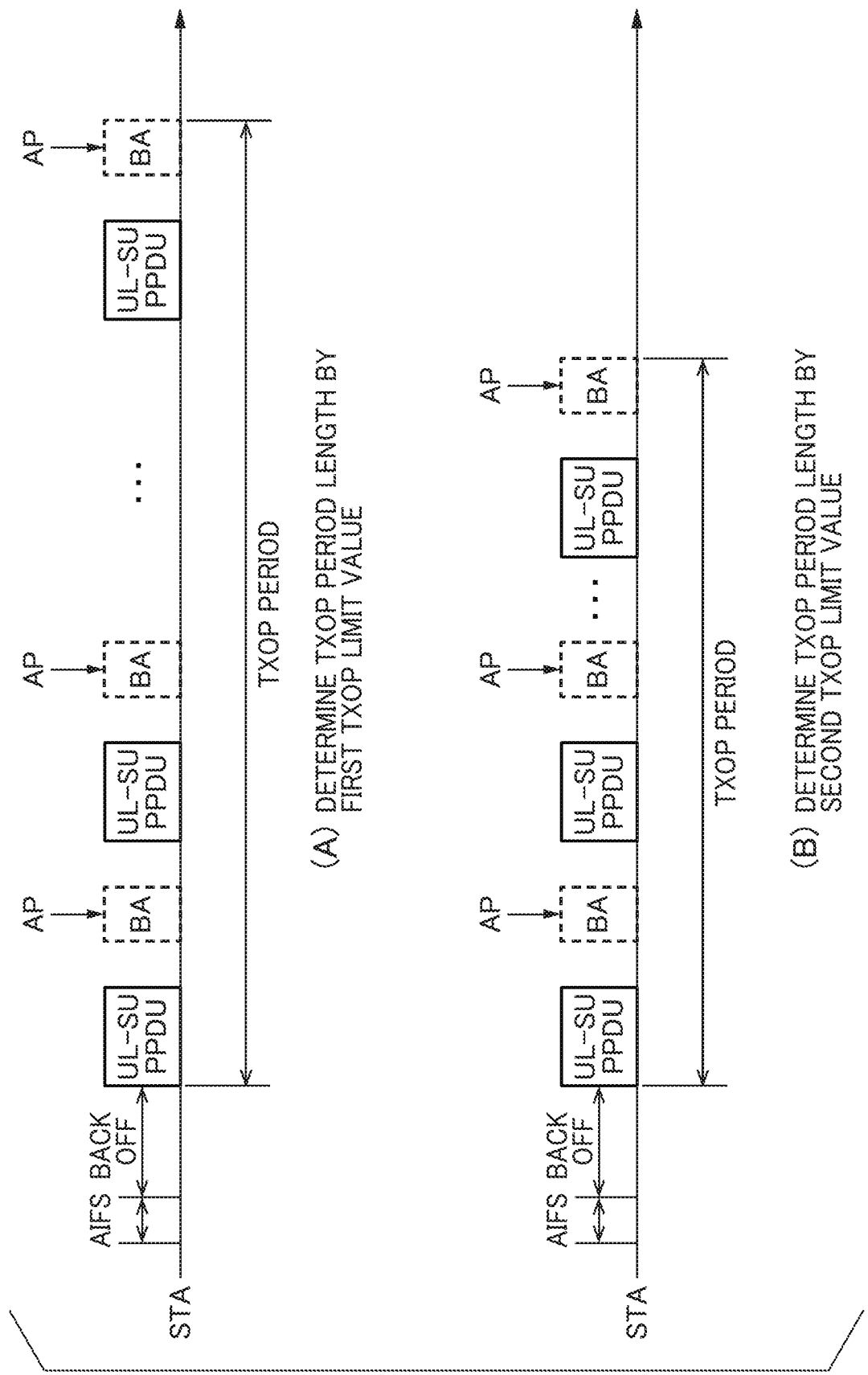
FIG. 11 is an explanatory diagram illustrating effects of the second operation example.

FIG. 11(A) illustrates an example of sequence according to which the TXOP is determined within the first TXOP limit value, and transmission of the physical packet including the data frame and the reception of the acknowledgement response frame (BA frame) are repeatedly carried out within the TXOP. FIG. 11(B) illustrates an example of sequence according to which the TXOP is determined within the second TXOP limit value that is lower than the first TXOP limit value and the transmission of the physical packet including the data frame and the reception of the acknowledgement response frame (BA frame) are repeatedly carried out within the TXOP. The rectangles drawn by dotted lines in FIG. 11(A) and FIG. 11(B) indicate the fact that this is a frame (here, a BA frame) received from the base station.

Since a longer TXOP can be specified in FIG. 11(A), more data can be transmitted by SU transmission. Accordingly, it is made possible to maintain the fairness in terms of use of wireless media between a terminal that is specified by the trigger frame and successful in the UL-MU transmission (a terminal to which the second TXOP limit value is applied) and other terminals (terminals to which the first TXOP limit value is applied). Also, since the TXOP limit is restricted in the SU transmission of the terminals that succeeded in the UL-MU transmission, the period during which the wireless medium is occupied is decreased, making it easier to ensure a period during which the base station can transmit the trigger frame.

In the above-described sequence, the terminal specified by the trigger frame even when it failed in its UL-MU transmission maintains the operation of the timer, and the second TXOP limit value is used prior to timeout of the timer. This is because the terminal had priority relative to the remaining terminals in that it was given the opportunity of transmission despite the failure in the UL-MU transmission. As another method, it is also possible that (re-)activation of the timer by this trigger frame does not take place if a terminal specified by the trigger frame failed in the UL-MU transmission. In this context, the other method is an approach that weighs the fact that the transmission was not successful.

In the above-described sequence, Expression 1 is calculated on the basis of the first TXOP limit value and the second TXOP limit values calculated. Meanwhile, the second TXOP limit value may be stored in advance in the database. In this case, the terminal should read the second TXOP limit value from the database. The multiple values of the TXOP limit made stepwise smaller than the first TXOP limit may be stored in the databases (second TXOP limit to m-th TXOP limit, where m is an integer not smaller than 3). In this case, TXOP limit values may be used that are lowered stepwise every time the access right for SU transmission is acquired by carrier sensing in a period prior to timeout of the timer.

In the above-described sequence, only the TXOP limit from among the EDCA parameters is changed to a smaller value. Meanwhile, other EDCA parameters may be changed along with the TXOP limit. By way of example, CWmin, CWmax, or both of them may be changed to a larger value. Alternatively, AIFSN may be changed to a larger value. With regard to the method of changing parameters, the same method used in changing the TXOP limit may or should be used. For example, it may be multiplied by a predetermined coefficient, or a method may be used according to which the one candidate or multiple values that stepwise becomes larger are stored in advance in the database. When AIFSN, CWmin, and/or CWmax are to be changed, these values are prepared in advance for the next SU transmission, so that it is necessary to take into account the behavior in the case where the timer times out in a state where the countdown of the backoff counter has already been started. In the case where the timer times out in the state where countdown of the backoff counter has already been started, for example, the countdown is maintained on an as-is basis to attempt acquisition of the access right, and the changed values of AIFSN, CWmin, and CWmax are applied at the time of restarting the backoff counter. It is also possible that the above-described TXOP limit is applied at the same or similar timing. Alternatively, with regard to CWmin and CWmax, it is also possible that the current value already being counted down is compared with the initial value of the backoff counter derived from the newly used parameters, and, if the newly derived initial value is smaller than that, then the current countdown value is substituted by this initial value.

Figure 12:
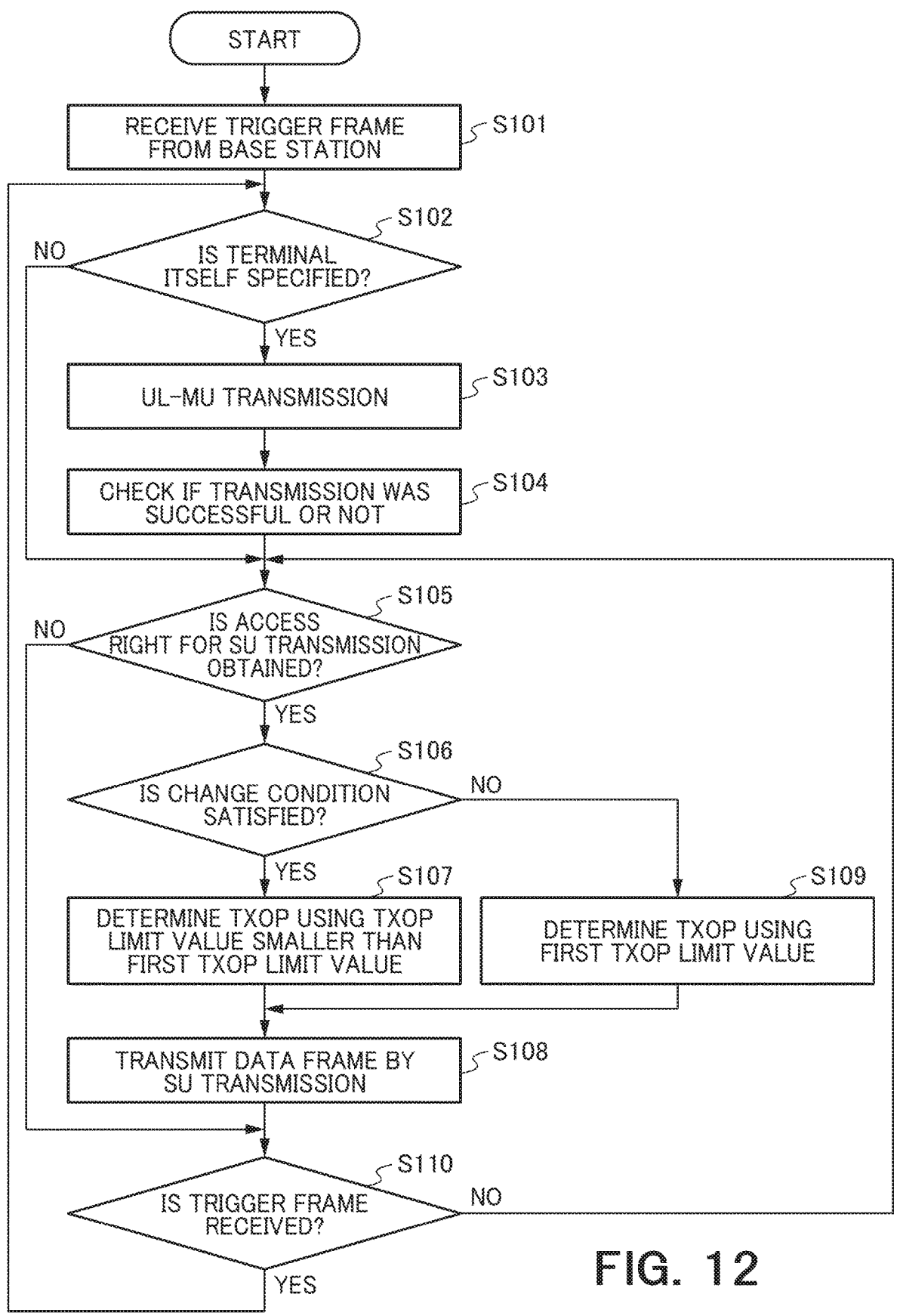
FIG. 12 is a diagram illustrating a flowchart of an exemplary operation of a terminal according to the second operation example of the embodiment of the present invention.

FIG. 12 is a flowchart of the operation of the terminal according to the second operation example of this embodiment.

When the terminal receives a trigger frame from the base station (S101), the terminal determines whether or not the terminal itself is specified for UL-MU on the basis of the trigger frame (S102). If the terminal itself is specified, the terminal transmits the physical packet including the data frame by UL-MU transmission upon lapse of a predetermined duration after completion of receipt of the trigger frame (S103). The terminal receives, after UL-MU transmission, an acknowledgement response frame (M-BA frame, etc.) transmitted from the base station, examines the acknowledgement response frame, and thereby determines whether or not UL-MU transmission was successful (S104). If any data whose transmission was not successful exists, the terminal determines to re-transmit the data at or after the next opportunity of transmission (UL-MU transmission or SU transmission).

If any data that the terminal wants to transmit by UL transmission still exists after the UL-MU transmission, the terminal carries out carrier sensing during the waiting time which is the sum of the AIFS[AC] and the randomly determined backoff duration so as to acquire the access right for SU transmission. If no carrier is sensed during the carrier sensing, the terminal acquires the access right to access a wireless medium. If the access right has been successfully acquired, the terminal reads data from the transmission buffer of the relevant AC and generates the data frame. At this point, the TXOP limit value to be used is determined and the TXOP is determined within the range not larger than this TXOP limit value. Specifically, whether or not the change condition is satisfied is determined (S106). If the change condition is not satisfied, it is determined to use the first TXOP limit value and the TXOP is determined within the range not larger than the first TXOP limit value (S109). Meanwhile, if the change condition is satisfied, the TXOP is determined within the second TXOP limit value that is lower than the first TXOP limit value (S107). By way of example, the first TXOP limit value is the default value defined in advance by the system (see FIG. 7), or a value that the base station specified in advance within the BSS The terminal sets a value in accordance with the determined TXOP in Duration/ID field of the MAC header of the data frame to be transmitted. The terminal then transmits the physical packet including the data frame by SU transmission (S108). After that, if the next trigger frame is not received (NO in S110) and any data that the terminal wants to transmit exists, then the process goes back to the step S105. As has been described in the foregoing, the TXOP limit value may be further lowered stepwise every time the access right for SU is acquired. If the next trigger frame is received (YES in S110), the process goes back to the step S102.

Here, an example of the change condition is described in detail. As in the above-described second exemplary sequence, the first change condition demands that it is included in the predetermined duration from the completion of receipt of the trigger frame (or start of transmission) when the terminal itself is specified by the trigger frame and the UL-MU transmission has been successful. If it is included in the predetermined duration, the change condition is satisfied, and, if it is not included therein, the change condition is not satisfied. The length of the predetermined duration is, for example, when the trigger frame is transmitted with a predetermined period, identical to the length of the predetermined period. Alternatively, it may be shorter or longer than that.

As a specific example of implementation, as has been described in the foregoing, a timer for which the length of the predetermined duration (e.g., the period length of the trigger frame) is set is activated at the time of completion of receipt of the trigger frame, and it is determined that the change condition is satisfied while the timer does not time out. If the timer is not activated or if the timer times out, it is determined that the change condition is not satisfied. In this case, the change condition continues to be determined as not being satisfied at least until the reception of the next trigger frame.

The starting point from which the timer is operated is not limited to the time point of completion of receipt of the trigger frame. After the completion of receipt of the trigger frame, for example, the timer may be set at the time point at which the fact of the successful transmission of the device itself is confirmed by reception of the M-BA frame. In this case, the value set to the timer may be the remaining time until reception of the next trigger frame. The value set to the timer should be adjusted as appropriate in accordance with at which time point the timer is set.

Here, an example of determining the value set in the timer (hereinafter referred to as "timer setting value") is illustrated. There are two methods of determining the timer setting value, i.e., the methods of determining the timer setting value by the terminal and by the base station.

When the terminal determines the timer setting value, for example, the terminal observes the transmission period of the trigger frame and determines the timer setting value as an integral multiple of the transmission period of the trigger frame. The terminal may determine, as the timer setting value, a value obtained by subtracting the packet length (PPDU length) of the trigger frame from the integral multiple of the transmission period. The integer by which the transmission period is multiplied may be determined in accordance with the traffic (the data amount of the transmission buffer, etc.) that the terminal has. For example, the value of the integer may be made smaller or larger as the data amount accumulated in the transmission buffer of AC_VO becomes larger or smaller. Alternatively, an inverted relationship with respect thereto may be specified.

Alternatively, the base station may notify the transmission period of the trigger frame in advance to the multiple terminals in the BSS and the respective terminals may determine the timer setting value based on the traffic (data amount) of the terminal itself and the notified transmission period. For example, a threshold in accordance with the transmission period is specified, and if the traffic is not larger than the threshold, then the timer setting value is set as a larger value, and if it is larger than the threshold, timer setting value is set as a smaller value. Alternatively, an inverted relationship with respect thereto may be specified. The threshold may be specified as a larger value as the transmission period becomes larger.

When the timer setting value is to be determined by the base station, then, by way of example, the base station receives a buffer status report (BSR) from the terminal belonging to the BSS, and determines the timer setting value using the BSR. For example, BSR includes information on the traffic of each AC. BSR may be put into QoS Control field or the HE Control field and transmitted as an information element of the management frame. BSR may be transmitted spontaneously by the terminal, or the base station may send a transmission request to transmit the BSR to the terminal and the terminal may transmit the BSR in accordance with the request. The transmission request may be included in the trigger frame.

The base station may determine the timer setting values for each terminal. For example, the timer setting value is made smaller in response to the traffic that the terminal has being larger, and, alternatively, the setting value is made larger in response to the traffic being smaller. Alternatively, an inverted relationship with respect thereto may be specified. Also, the base station may determine the common timer setting value applicable to multiple terminals. In this case, the traffic (data amounts) of the multiple terminals traffic is subjected to statistical processing (e.g., averaging) and thus the timer setting value should be determined. The timer setting value may be determined for each AC. The base station notifies the time setting values specified on a per-terminal basis or the common timer setting value applicable to the multiple terminals to the individual terminals. The trigger frame may be used for the notification, or a management frame such as a beacon frame, etc. or other frames may be used therefor.

As the second example of the change condition, a condition may be applied that demands that the terminal itself is specified by the trigger frame, the UL-MU transmission is successful, and that a predetermined frame has been received thereafter. As the predetermined frame, the beacon frame may be used. Prior to receiving the beacon frame, it is determined that the change condition is satisfied, and when the beacon frame has been received, it is determined that the change condition is not satisfied anymore. After that, when the terminal itself is specified by the next trigger frame and the UL-MU transmission has been successful, it is again determined that the change condition is satisfied. The period of the trigger frame considered here is shorter than the period of the beacon frame. Meanwhile, it may be longer than that. Here, a case is described where the beacon frame is used as the predetermined frame. Meanwhile, other frames may be used. If the timing at which the predetermined frame is received is known in advance, the same or similar operation can be implemented using the above-described method using a timer. The type of the received frame may be determined, for example, by analyzing the type and subtype of Frame Control field of the MAC header.

As the third example of the change condition, whether or not the change condition is satisfied may be determined on the basis of the number of times of reception of the trigger frame and the number of times of successful frame transmission (UL-MU transmission) in response to the trigger frame. For example, the change condition may be determined as being satisfied when the ratio of the number of times of successful frame transmission with respect to the number of times of reception of the trigger frame is equal to or larger than a threshold, and it may be determined that the change condition is not satisfied when the ratio is less than the threshold. By way of example, when the change condition is satisfied, the second TXOP limit value is used. If it is not satisfied, then the first TXOP limit value is used. In this manner, the TXOP limit value to be used is controlled on the basis of the number of times of reception of the trigger frame and the number of times of successful frame transmission.

As the fourth example of the change condition, whether or not the change condition is satisfied may be determined on the basis of the number of times of successful frame transmission (UL-MU transmission) in response to the trigger frame and the number of times of frame transmission by single-user transmission. For example, the change condition may be determined as being satisfied when the ratio of the number of times of successful UL-MU transmission with respect to the number of times of the single-user transmission is equal to or larger than a threshold, and that the change condition is not satisfied if the ratio is less than the threshold. By way of example, when the change condition is satisfied, the second TXOP limit value is used, and the first TXOP limit value is used if it is not satisfied. In this manner, the TXOP limit value to be used is controlled on the basis of the number of times of successful single-user transmission and the number of times of successful UL-MU transmission. In other words, in this case, the value of the TXOP limit is controlled such that it is changed using the history of the SU transmission in addition to the history of the UL-MU transmission. The history of the SU transmission includes at least one of: whether or not SU transmission is executed; the number of times of execution of SU transmission; execution result of either successful or unsuccessful SU transmission; and an elapsed time after the SU transmission (e.g., SU transmission serving as the standard, the SU transmission carried out at a predetermined time point, etc.).

According to the above-described third and fourth examples of the change condition, the number of times of frame transmission in response to the trigger frame (the number of times of the device itself being specified) may be used instead of the number of times of successful frame transmission in response to the trigger frame (UL-MU transmission).

In the above-described example of the first change condition, the second TXOP limit value is used, regarding that the change condition is satisfied, until the timer times out. Meanwhile, the second TXOP limit value may be changed stepwise in accordance with the elapsed time. For example, the second TXOP limit value may be made larger such that it becomes closer to the first TXOP limit value as the timeout gets closer.

Also, in the above-described example of the third change condition, the second TXOP limit value is used, regarding that the change condition is satisfied when the ratio of the number of times of successful frame transmission with respect to the number of times of reception of the trigger frame becomes equal to or larger than the threshold. As another method, the TXOP limit value may be changed (the TXOP limit value may be made smaller) such that it has a larger difference from the first TXOP limit value in response to the ratio becoming larger. Alternatively, the TXOP limit value may be controlled (the TXOP limit value may be made larger) such that it has a smaller difference from the first TXOP limit value in response to the ratio becoming smaller.

Also, according to the fourth example of the change condition, the second TXOP limit value is used regarding that the change condition is satisfied when the ratio of the number of times successful UL-MU transmission with respect to the number of times successful single-user transmission becomes equal to or larger than the threshold. As another method, the TXOP limit value may be modified (the TXOP limit value is made smaller) such that it has a larger difference from the first TXOP limit value in response to the ratio becoming larger. Alternatively, the TXOP limit value may be controlled (the TXOP limit value may be made larger) such that it has a smaller difference from the first TXOP limit value in response to the ratio becoming smaller.

In the above-described second operation example, changes to the TXOP limit value are made by the operation of the terminals. Meanwhile, the base station may determine the TXOP limit values to be used by the respective terminals on the basis of the history of the UL-MU transmission of the respective terminals and notify the determined TXOP limit values to the individual terminals. The trigger frame or other frames such as beacon frame, etc. can be used for the notification. With regard to the method for the base station to determine the TXOP limit value to be used by the respective terminals, an algorithm similar to that in the determination made by the above-described terminal may be used. It is also possible that the base station determines the TXOP limit value to be used for only at least one terminal among the multiple terminals and the remaining terminals determine on their own account the TXOP limit values to be used by them. In this case, the base station should notify the TXOP limit value only at least to the one terminal.

The change condition to be used among the above-described first to fourth change conditions may be stored in advance in the terminal or the base station may notify the information identifying this change condition to the respective terminals. By way of example, a trigger frame or another frame such as beacon frame, etc. can be used for the notification.

As described above, according to the second operation example, the TXOP limit value is changed to a smaller value with regard to the data pertaining to the same AC as that of the data transmitted by UL-MU transmission. Meanwhile, with regard to the other ACs as well, the TXOP limit value may be changed. However, it is required that the lower limit value of TXOP limit value be 0 and, if the default value of the TXOP limit is 0, then it is not changed to a value smaller than that. It is possible to make it smaller than that, but, in this case, TXOP should be determined regarding that the TXOP limit value is 0.

For example, a case is considered where an AC (provisionally denoted as "AC-1") to which the data transmitted by UL-MU transmission in the step S103 of FIG. 12 belongs is different from an AC (provisionally denoted as "AC-2") to which the data to be transmitted by SU in the subsequent step S108 belongs. Also in this case, in accordance with the operation flow of FIG. 12, change to the TXOP limit value may be made in the step S107 for SU transmission of the data belonging to AC-2. Alternatively, if AC-1 and AC-2 are different from each other, then it is also possible to not perform change to the TXOP limit value, regarding that the operation flow of FIG. 12 is not applicable to this case (the normal TXOP limit value is used).

Also, in the above-described second operation example, the case has been considered where the AC of the data to be transmitted by UL-MU transmission is determined on the side of the terminal. Meanwhile, in the same manner as in the first operation example, the base station may recommend or specify the AC by the trigger frame. The operation in the case where the AC has been recommended or specified by the trigger frame may or should proceed in accordance with the first operation example.

In addition, in the above-described second operation example, in the same manner as in the first operation example, the base station may transmit, as the trigger frame, the trigger frame for random access (TF-R). In this case, in the flowchart of FIG. 12, the determination of whether or not the terminal itself is specified by the trigger frame (S102 of FIG. 12) should be substituted by the determination on the terminal's side of whether or not the random access should be made. In addition, when it has been determined to make a random access, the process should proceed to the step S103 of FIG. 12.

In the above-described second operation example, the value obtained by subtracting the transmission packet length from the determined TXOP is set in Duration/ID field of the MAC header as the reserve time of the wireless medium. Meanwhile, if the same or similar field exists in the physical header, the reserve time may be set in the physical header. Also, if the field in which the value of the determined TXOP is stored exists in the physical header or the MAC header, the value of this TXOP may be stored in this field.

Third Operation Example of this Embodiment

A case is considered where a terminal can selectively enable or disable the UL-MU capability. The terminal may change the TXOP limit value in accordance with the setting status of whether the UL-MU capability is enabled or disabled. For example, consider a case where other systems with which the antenna is shared within the terminal (LTE (Long Term Evolution), Bluetooth™, etc.). When the problem of radio wave interference exists between the wireless LAN circuit and other systems, a possible approach is to disable the UL-MU capability within the terminal to mitigate the interference problem. In an UL-MU-supported environment, when UL-MU transmission is performed in response to the trigger frame from the base station, it is necessary to perform transmission according to the condition specified by the trigger frame (e.g., it is necessary to carry out transmission with the transmission power specified by the base station), so that this may cause interference with the other systems. In view of this, a possible approach for the terminal is to disable the UL-MU capability and enter the SU mode.

When the UL-MU capability is disabled, the terminal uses the normal TXOP limit value (first TXOP limit value) illustrated in FIG. 7. When the UL-MU capability is enabled, the TXOP limit value whose priority level is lowered (whose value is lowered) is used. Change to the TXOP limit value may be performed only for AC-VO and AC-VI having the default value of the TXOP limit that is larger than 0. The TXOP limit value after the change may be defined in advance or may be determined by the base station and notified to the terminals. The notification from the base station may be made by a management frame such as beacon frame, association response frame, etc. or may be made by other types of frames. Also, the above-described other operation example, for example, the operation based on the timer may be associated and in cooperation with the setting of whether or not the UL-MU capability is enabled or disabled. When the timer is activated and the change condition is satisfied, the UL-MU capability is enabled. When the timer is not activated (which includes a case where the timer times out) and the change condition is satisfied, UL-MU capability is disabled. The association and coordination should be realized in this manner or a similar manner.

Here, the explanations have been provided in the context of the TXOP limit as the EDCA parameter. Meanwhile, values of the other EDCA parameters such as CWmin, CWmax, and AIFSN may be controlled in the same or similar manner. For example, when the UL-MU capability is disabled, normal parameter values illustrated in FIG. 7 are used. When the UL-MU capability is enabled, the parameter value whose priority level is lowered (whose value is made larger) is used. Alternatively, when the UL-MU capability is disabled, a parameter value lower than the normal parameter value illustrated in FIG. 7 is used. When the UL-MU capability is enabled, the normal parameter value illustrated in FIG. 7 may be used. Methods other than those described herein may also be used. Any combination of values taken from among TXOP limit, CWmin, CWmax and AIFSN may be controlled in the same or similar manner.

The terminal notifies the information indicative of whether the UL-MU capability is enabled or disabled to the base station. The notification may be carried out, for example, providing a Null field in the HE Control field and setting a bit in this field. Alternatively, the notification may be carried out using a reserved area of an existing field, or it is also possible to rely on a method of notifying the information on whether or not the capability is enabled or disabled as an information element of any appropriate management frame. The base station that received the notification of the capability being disabled recognizes that this terminal is a terminal that cannot carry out UL-MU transmission and performs processing such as excluding this terminal from the targets of the UL-MU scheduling.

Figure 13:
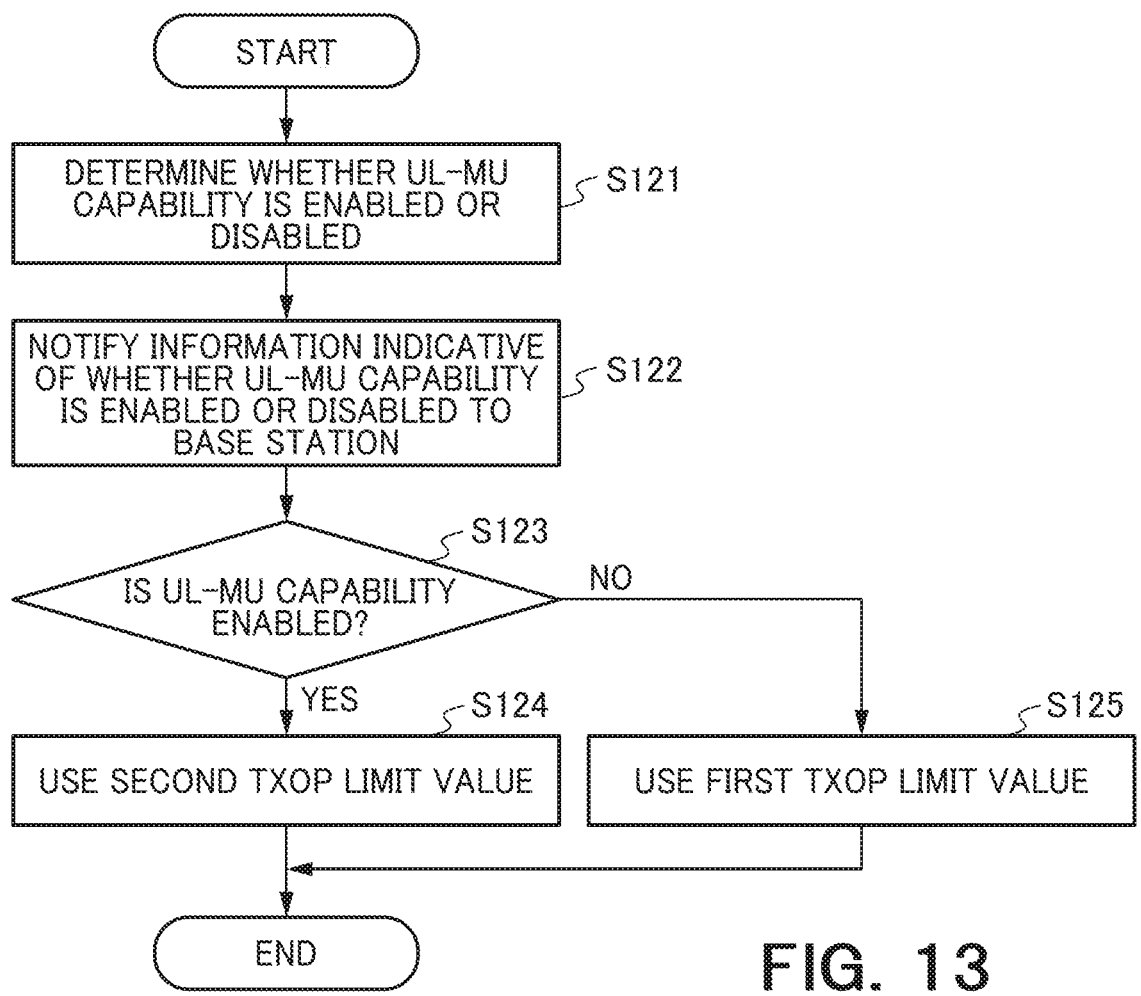
FIG. 13 is a diagram illustrating a flowchart of an exemplary operation of a terminal according to a third operation example of the embodiment of the present invention.

FIG. 13 is a flowchart of the operation of the terminal according to the third operation example of this embodiment. The terminal determines at any appropriate timing whether the UL-MU capability is enabled or disabled (S121). For example, interference with other systems with which the antenna is shared within the terminal is measured, and if the measured value is equal to or larger than a predetermined value, then the capability is determined as being disabled. Alternatively, another determination method may be used such as a method according to which the capability is always determined as being disabled when another predefined system is operating. When the terminal has determined the capability as being enabled or disabled, then the terminal notifies the information indicative of the capability being enabled or disabled to the base station (S122). When the terminal has determined that the UL-MU capability is disabled, the SU mode is entered and the terminal decides to use the normal TXOP limit value (first TXOP limit value) as the TXOP limit value. Meanwhile, when the UL-MU capability is enabled, the terminal decides to use the second TXOP limit value that is lower than the first TXOP limit value (S124).

In the above-described explanation, the terminal controls the change of the TXOP limit value. Meanwhile, the base station may determine the TXOP limit value to be used by this terminal on the basis of the setting status of the terminal of whether the UL-MU capability is enabled or disabled. In this case, the base station notifies the determined TXOP limit value to the terminal. It is also possible that the base station determines the TXOP limit value to be used by this terminal for only one terminal from among the multiple terminals while the remaining terminals determine the TXOP limit value to be used on their own account. In this case, the base station should perform notification to the at least one terminal.

Fourth Operation Example of this Embodiment

Transmission of the trigger frame by the base station is described. The following explanation is applicable to a case where the trigger frame is TF-R.

Figure 14:
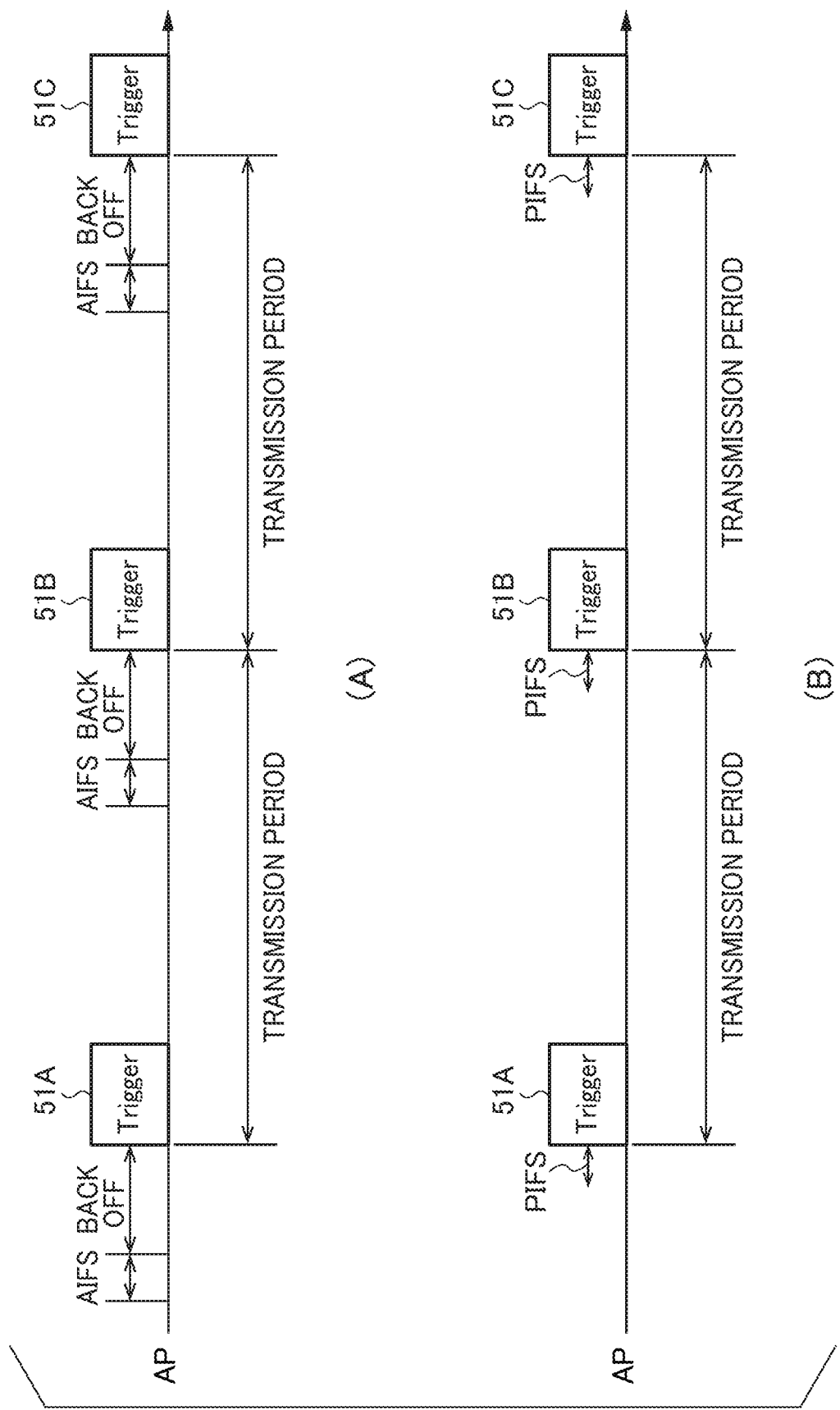
FIG. 14 is a diagram illustrating an example of sequence according to the third operation example of the embodiment of the present invention.

The base station, by way of example, periodically transmits the trigger frame. The base station carries out carrier sensing prior to transmission of the trigger frame. As has been described in the foregoing, carrier sensing is carried out during the fixed duration (AIFS, etc.) and the randomly defined backoff duration. If no carrier is sensed, the base station acquires the access right and transmits the trigger frame. An example transmission sequence to transmit the trigger frame in this case is illustrated in FIG. 14(A). Trigger frames 51A, 51B, and 51C are transmitted with a predetermined period. Prior to the transmission, carrier sensing is carried out during the AIFS and the backoff duration.

Alternatively, as another method of carrier sensing, it is also possible that, in the same manner as in the case of the beacon frame, carrier sensing is carried out during PIFS prior to transmission, the access right is acquired if no carrier is sensed, and the trigger frame is transmitted. The transmission sequence example of the trigger frame in this case is illustrated in FIG. 14(B). The carrier sensing is carried out prior to the transmission during PIFS. This is the same operation as in the case of the transmission of the beacon frame. By virtue of this, the trigger frame can be transmitted in the same manner as the beacon frame which is a management frame. It should be noted that another fixed duration may be used instead of PIFS.

Figure 15:
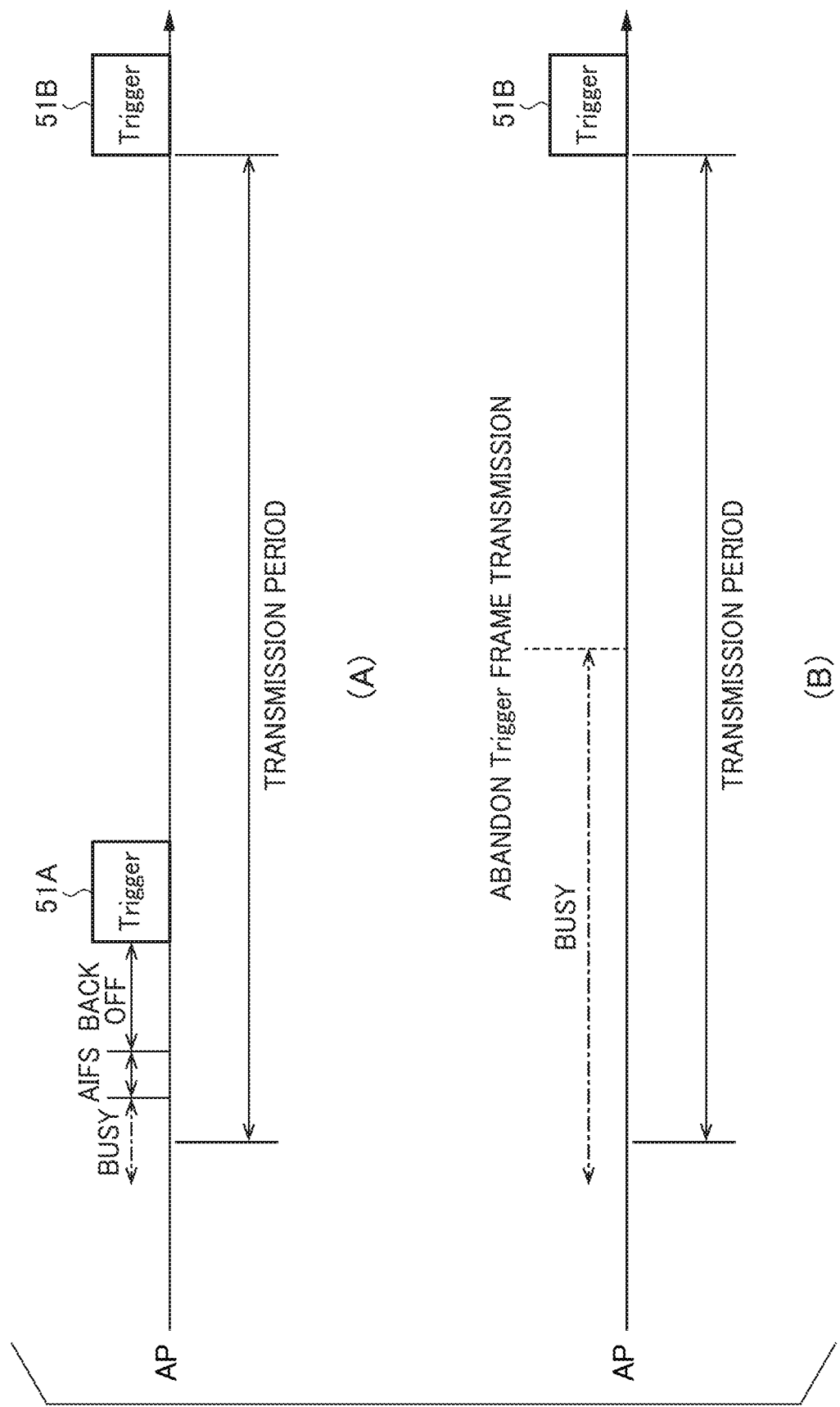
FIG. 15 is a diagram illustrating another example of sequence according to the third operation example of the embodiment of the present invention.

When any carrier has been sensed in the carrier sensing (busy), the base station cannot acquire the access right, so that it cannot transmit the trigger frame at the timing in the transmission period. In this case, the base station may carry out carrier sensing again, and repeatedly carry out the carrier sensing until the carrier sensing result indicative of the idle state is obtained. By virtue of this, the transmission timing of the trigger frame is delayed. An example of sequence of this case is illustrated in FIG. 15(A). Transmission of trigger frame 51A is delayed relative to the timing in the transmission period to transmit trigger frame 51A. This operation is similar to that of the case where "busy" resulted in the carrier sensing for transmission of the beacon frame. In other words, in the transmission of the beacon frame, if the carrier sensing busy results and the access right cannot acquired, then the carrier sensing is repeated until it is acquired.

When the base station repeatedly carries out carrier sensing and a predetermined condition is satisfied, the base station may stop (abandon) the transmission of the trigger frame and wait until the next transmission timing. As the predetermined condition, for example, when the remaining time to the next transmission timing becomes equal to or lower than a predetermined value, then it may be determined that the transmission of the trigger frame of this round should be stopped. Alternatively, when the threshold time from the timing of the transmission period has been exceeded, it may be determined that the transmission of the trigger frame of this round should be stopped. The threshold time may be determined in accordance with the length of the transmission period. For example, the threshold time may be a half of the length of the transmission period. An example of sequence of this case is illustrated in FIG. 15(B). Since "carrier sensing busy" continued, transmission of the trigger frame 51A cannot be performed even when the time of a half of the transmission period length has elapsed since the timing of the transmission period. As a consequence, transmission of trigger frame 51A is stopped.

The transmission period of the trigger frame may be fixed or adapted to be modified. Even in a case where the transmission period is to be modified, the method of the carrier sensing may be in the same or similar as those described above. If the transmission period can be changed, by way of example, the base station receives a buffer status report (BSR) from the terminal belonging to the BSS. BSR includes, for example, information on the traffic for each AC (amount of data existing in the transmission buffer, etc.). BSR may be put into QoS Control field or the HE Control field, or may be transmitted as an information element of the management frame. BSR may be transmitted spontaneously by the terminal, or the base station may send a transmission request to transmit the BSR to the terminal and the terminal may transmit the BSR in accordance with the request. The transmission request may be included in the trigger frame.

The base station may determine the transmission period of the trigger frame on the basis of the BSR received from multiple terminals. For example, the transmission period is determined in accordance with the number of terminals and the data amounts that the respective terminals have. Specifically, the transmission period may be made shorter or longer when more terminals have the predetermined amount or more of the data. Also, the transmission period may be made shorter or longer when a predetermined number or more of the terminals exist and terminals have more amounts of data. This determination may be performed for the data amount of a particular AC or ACs or for the data amount aggregating those of all the ACs.

As has been explained above, the base station may recommend or specify the AC for which UL-MU transmission is performed by the trigger frame. In this case, the AC to be recommended or specified may be the common AC applicable to all the terminals, or ACs individually recommended or specified on a per-terminal basis. When the common recommendation or specification is to be performed, the base station may determines TXOP within the TXOP limit value of the relevant AC and set the period of NAV (a value obtained by subtracting the packet length of the trigger frame from the TXOP value) in Duration/ID field of the MAC header of the trigger frame. By virtue of this, the base station can specify NAV in the BSS and prevent transmission by a hidden terminal or the like during UL-MU from being carried out.

Figure 16:
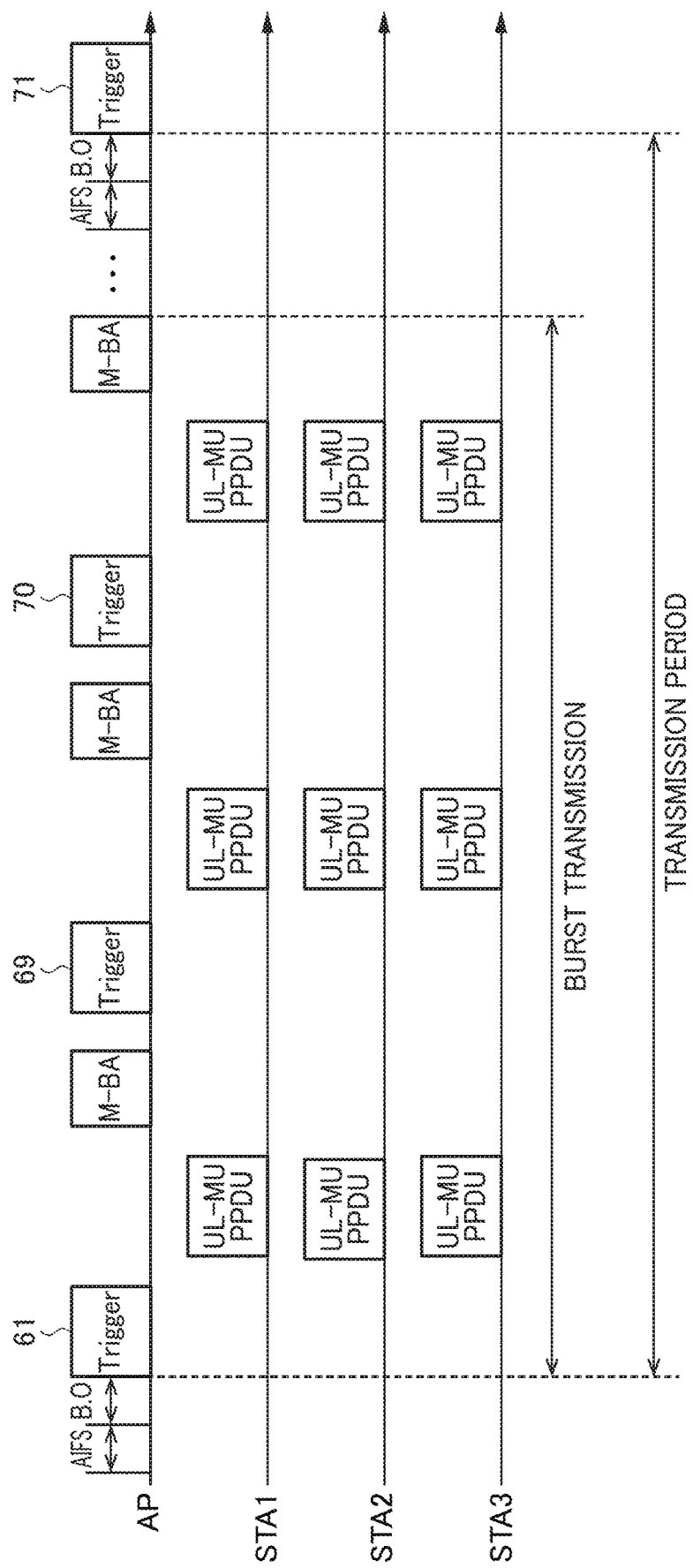
FIG. 16 is a diagram illustrating yet another example of sequence according to the third operation example of the embodiment of the present invention.

Burst transmission may be carried out in which transmission of the trigger frame, UL-MU transmission, and transmission of the M-BA frame are continuously repeated. An example of the burst transmission is illustrated in FIG. 16. First, trigger frame 61 is transmitted by the access right obtained as the result of the fact that the wireless medium is idle by carrier sensing, and UL-MU transmission from multiple terminals and M-BA frame transmission from the base station are carried out. After that, the base station transmits trigger frame 69 upon lapse of PIFS without performing examination of the wireless medium by carrier sensing. Thereafter, the same or similar sequence is repeated. In such burst transmission, the base station carries out only one round of carrier sensing at the outset for transmitting trigger frame 61 which serves as the starting point of the burst transmission. Since it is not necessary to carry out carrier sensing prior to transmission of trigger frame 69, 70, etc. during the burst transmission period, it is made possible to carry out efficient communications. After the end of the burst transmission, when the base station carries out the burst transmission again at any appropriate time point, the base station carries out the carrier sensing again and acquires the access right. When such burst transmission is performed, the transmission period of the trigger frame may be an interval from the trigger frame 61 which serves as the starting point of the burst transmission to trigger frame 71 which serves as the starting point of the next burst transmission. In the above-described second operation example of this embodiment, the example has been illustrated where the transmission period of the trigger frame or a value that corresponds to an integral multiple thereof is set to the timer. Meanwhile, the transmission period may be the transmission period of the trigger frame which serves as the starting point of the burst transmission.

The format of the trigger frame, the format of the M-BA frame, UL-MU-MIMO, and UL-OFDMA are described in detail below.

(Trigger Frame)

FIG. 17(A) is a diagram showing an exemplary format of the trigger frame. This has a format of a general MAC frame as a base shown in FIG. 3 and includes Frame Control field, Duration/ID field, Address 1 field, and Address 2 field, the common information field (Common Info.) field, plural terminal information (Per User Info.) fields and FCS field. The frame is specified to be the trigger frame by the Type and Subtype fields in Frame Control field. The Type is "control" as an example, and the Subtype may define a new value corresponding to the trigger frame. However, the trigger frame can be defined with the Type being "management" or "data". Note that, instead of defining a new value as the Subtype, a reserved field of the MAC header can be used as a field notifying that a frame is the trigger frame.

Address 1 field may be set to a broadcast address or a multicast address as an RA. Address 2 field may be set to a MAC address of the base station (BSSID) as a TA. However, Address 1 field or Address 2 field, or both of them may be omitted in some cases. The common information field is set to notify information common to the plural terminals to which UL-MU transmission is designated. For example, information specifying a format of the terminal information field, information specifying a length of the packet transmitted in response, information representing an intended purpose (or use application) of the trigger frame, and information specifying a type of the frame to be transmitted in response to the trigger frame can be also set therein. Information on a recommended AC or a specified AC as AC to which data to be transmitted belongs may be set therein. Information on the number of the terminal information fields can be also set therein. Also, when multiple terminals belong to the same group identified by its group ID, the group ID may be set. Alternatively, the timer setting value described in the second operation example of this embodiment may be set in the common information field. In this case, by way of example, the format of the common information field illustrated in FIG. 17(B) may be used. In this example, a Timer Value sub-field notifying the timer setting value is provided before the Type-dependent Common Info sub-field. However, the format of FIG. 17(B) is merely an example and other sub-fields may exist, and some of the sub-fields may be omitted. The position of the Timer Value sub-field is not limited to the position of FIG. 17(B), either.

Information (identifiers of terminals such as AID) specifying the terminals for UL-MU transmission, and parameter information individually notified to the terminals are set in the terminal information fields. For example, a piece of information regarding the resource to be used by the terminal in UL-MU transmission is specified. Also, pieces of information specifying the transmission power to be used by the terminal, MCS, and the like may be set. The terminal that received the trigger frame carries out UL-MU transmission in accordance with the parameter information specified by the common information field and the terminal information field in which the identifier of the terminal itself is set. There are cases where the identifier of the terminal is omitted from the terminal information field, for example, a case where the group ID is set in the common information field.

Also, the timer setting value described in the second operation example of this embodiment may be set in the terminal information field. In this case, by way of example, the format of terminal information field illustrated in FIG. 17(C) may be used. In this example, a Timer Value sub-field notifying the time setting value is provided before the Type-dependent Per User Info variable sub-field. However, the format of FIG. 17(C) is merely an example and other sub-fields may exist, and some of the sub-fields may be omitted. The position of the Timer Value sub-field is not limited to the position of FIG. 17(C), either.

In the case of the trigger frame for random access (TF-R), by way of example, a format identical to that of FIG. 17 can be used. For example, information indicative of the fact that the use is not limited to a particular terminal or terminals is set in the terminal information field. Specifically, X which is a value of an unused AID may be specified. The value of X may be notified in advance from the base station to the respective terminals by the management frame such as beacon frame. A resource for which X is set (e.g., in the case of OFDMA, resource unit) is a resource any terminal is allowed to use, i.e., a resource for random access. The terminal randomly selects terminal information field in which X is set and uses the resource described therein for the UL-MU transmission. In the case of TF-R, all the terminal information fields may be set to X or the AID of the terminal may be set in part of the terminal information fields. In this case, the resource set in the part of terminal information fields is used by the terminal having this AID. Even a terminal that has the AID set in any one of the terminal information fields may be allowed to use the resource described in the terminal information field to which X is set in addition to the resource specified for the terminal itself. The terminal that received the TF-R selects the resource on the basis of a method similar to the random backoff method. For example, the resource selection is carried out regarding that the selection right is given when the value obtained by subtracting the number of resources for which X is set from the randomly selected random backoff counter value becomes equal to or less than 0. If it is larger than 0, the random access of this round is put off and presence or absence of the selection right is determined in the same or similar manner at the time of the next round of TF-R reception using the random backoff counter value after the subtraction. Any methods other than those described herein may be used as the method of realizing the trigger frame for random access.

It should be noted that a configuration is possible according to which use of the resource for random access is limited to the particular terminals or particular groups having particular group IDs. In the former case, multiple AIDs may be set. In the latter case, the group ID may be set in the terminal information field.

(Multi-STA BA Frame)

Figure 18:
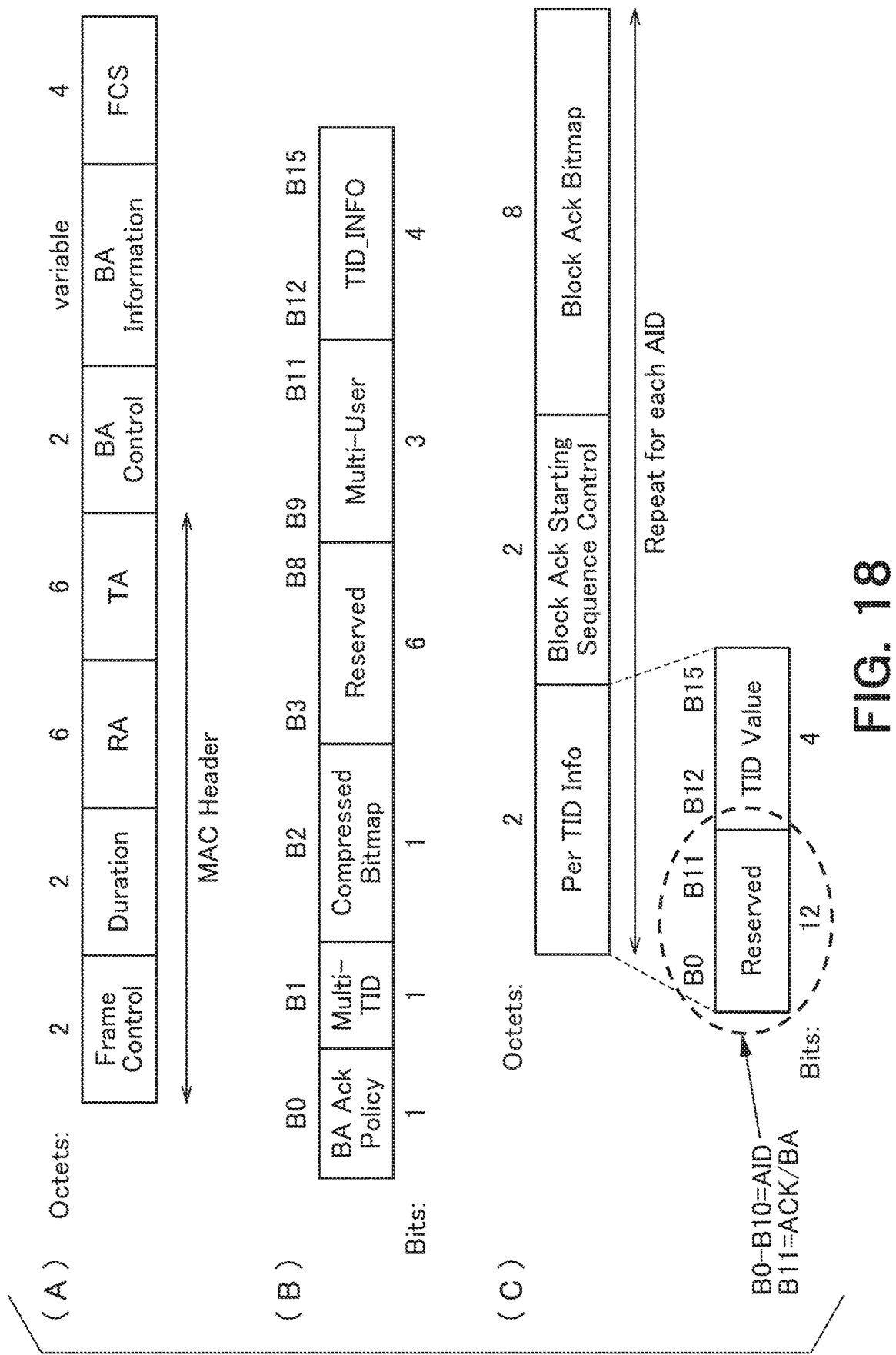
FIG. 18 is an explanatory diagram of a Multi-STA BA frame.

The Multi-STA BA frame is obtained by diverting the Block Ack frame (BA frame) thereto in order to make the acknowledgement to plural terminals by one frame. A frame type may be "Control" similarly to the ordinary BA frame, and a frame subtype may be "BlockAck". FIG. 18(A) shows an exemplary frame format in the case of reusing the Multi-STA BA frame. FIG. 18(B) shows an exemplary frame format of a BA Control field of the BA frame, and FIG. 18(C) shows an exemplary frame format of a BA Information field of the BA frame. In the case of reusing the BA frame, an indication may be in the BA Control field that the BA frame format is that extended for notifying the acknowledgement response regarding the plural wireless terminals. For example, in IEEE802.11 standard, a case where a Multi-TID subfield is 1 and a Compressed Bitmap subfield is 0 is reserved. This may be used in order to indicate that the BA frame format is extended for notifying the acknowledgement response regarding to plural wireless terminals. Alternatively, an area of bits B3-B8 is a reserved subfield in FIG. 18(B), but all or a part of this area may be defined in order to indicate that the BA frame format is that extended for notifying the acknowledgement response regarding to plural wireless terminals. Alternatively, the notification as described here may not be necessarily made explicitly.

The RA field of the Multi-STA BA frame may be set to a broadcast address or a multicast address as an example. A Multi-User subfield in the BA Control field may be set to the number of the users (number of the terminals) to be reported by means of the BA Information field. In the BA Information field, there are arranged for each user (terminal), an Association ID subfield, a Block Ack Starting Sequence Control subfield, and a Block Ack Bitmap subfield.

The Association ID subfield is set to the AID for identifying the user. More specifically, as an example, a part of a Per TID Info field is used as the subfield for the Association ID as shown in FIG. 18(C). Currently, 12 bits (from B0 to B11) are a reserved area. The first 11 bits (B0-B10) of these are used as the subfield for the Association ID. The Block Ack Starting Sequence Control subfield and the Block Ack Bitmap subfield may be omitted if the frame transmitted by the terminal is a single data frame (that is, it is not an aggregation frame). As another example, a partial state operation may be used and a corresponding sequence number may be expressed in the Block Ack Bitmap subfield. If the frame transmitted by the terminal is an aggregation frame, the Block Ack Starting Sequence Control subfield has stored therein a sequence number of the first MSDU (medium access control (MAC) service data unit) in the acknowledgement response shown by the Block Ack frame. In the Block Ack Bitmap subfield, a bitmap (Block Ack Bitmap) constituted by bits each showing reception success or failure for the sequence numbers subsequent to the Block Ack Starting Sequence number is set.

(UL-MU-MIMO)

Figure 19:
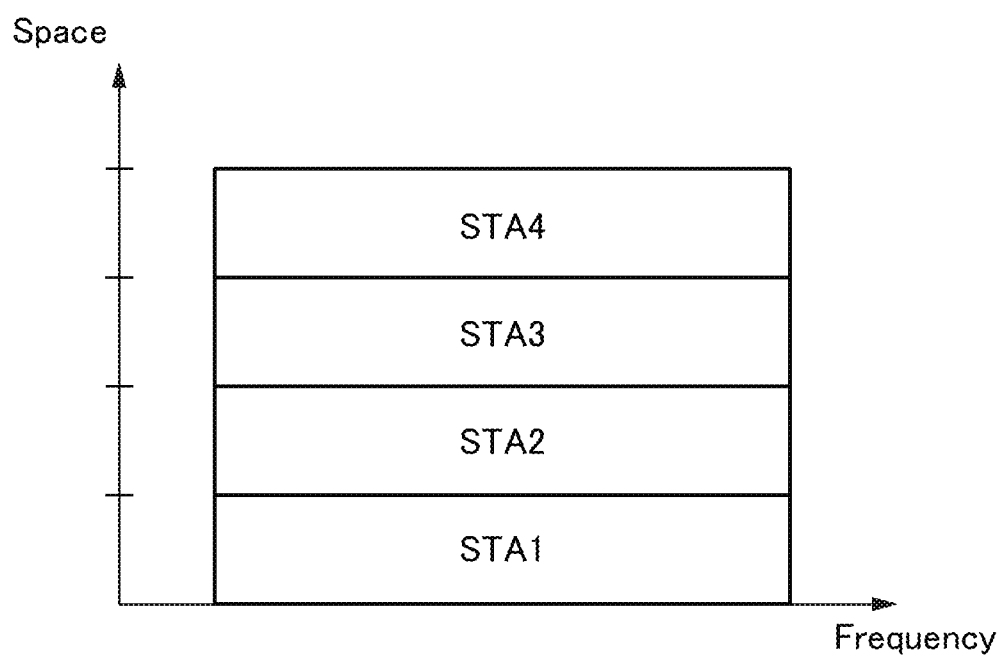
FIG. 19 is a diagram for explanation of the concept of UL-MU-MIMO.

UL-MU-MIMO is a scheme intended to make uplink transmissions more efficient, by arranging the plurality of terminals to each transmit (by a spatially multiplexing transmission) a frame to the base station by using mutually-the-same timing and mutually-the-same frequency band. FIG. 19 is a drawing for explaining a concept of MU-MIMO. Let us discuss an example in which the base station performs a UL-MU-MIMO communication with four terminals, namely the terminals 1 to 4. The terminals 1 to 4 simultaneously transmit frames by using mutually-the-same channel (of which the bandwidth may be arbitrary, such as 20 MHz, 40 MHz, or 80 MHz).

The base station receives these frames at the same time, but is capable of separating these frames by using a preamble signal contained in a physical header of each of the frames. Details of this capability will be explained in detail below. The base station receives the frames transmitted from the terminals by UL-MU-MIMO, as simultaneously-multiplexed signals. When implementing the UL-MU-MIMO scheme, the base station needs to spatially separate the frames of the plurality of terminals from the signals that were simultaneously received from the terminals. For this purpose, the base station utilizes a channel response of the uplink with each of the plurality of terminals. The base station is capable of estimating the channel responses of the uplinks with the terminals by using the preamble signal added on the head side of the frame transmitted by each of the terminals. More specifically, each of the preamble signals is contained in a preamble signal field within the physical header positioned on the head side of the frame.

Figure 20:
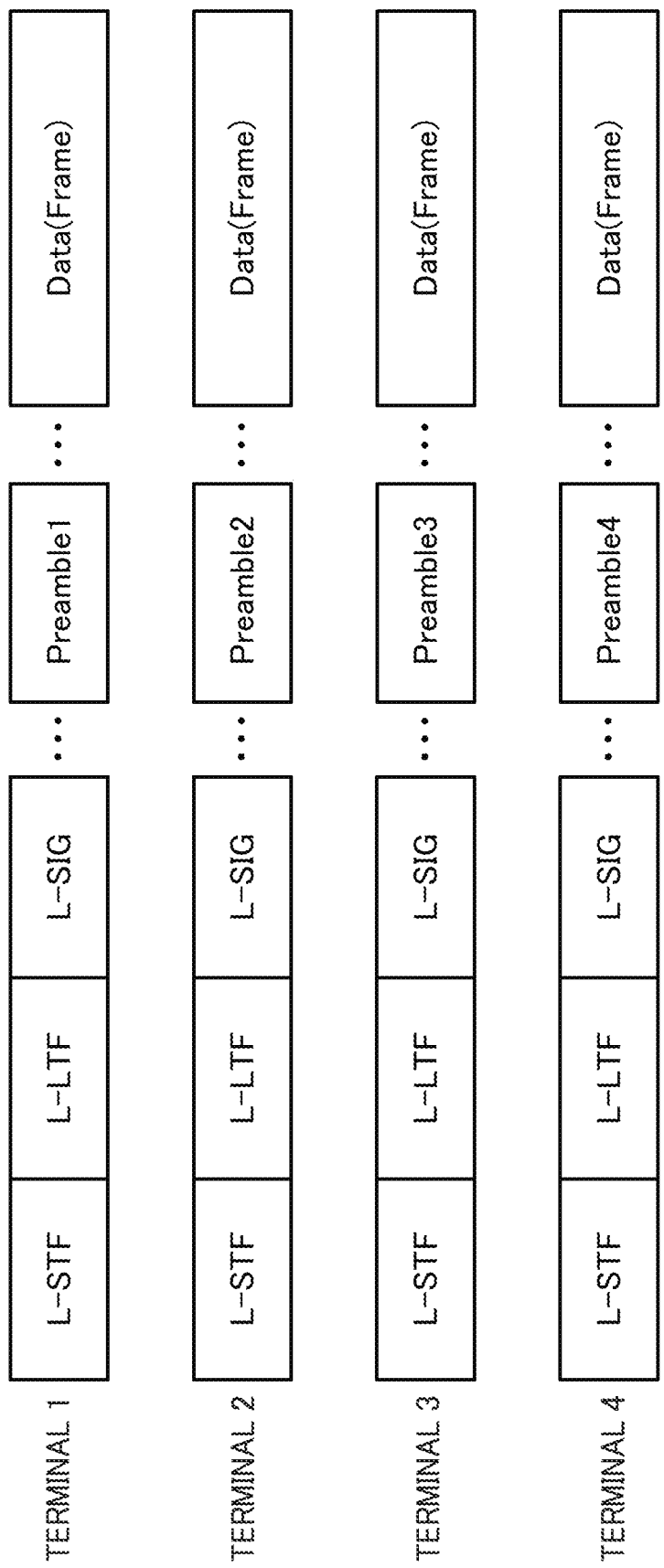
FIG. 20 is a diagram for explanation of a preamble used in UL-MU-MIMO.

FIG. 20 illustrates examples of configurations of physical packets containing the frames transmitted by the terminals 1 to 4. As illustrated in FIG. 20, each of the preamble signals is disposed in the preamble signal field positioned between an L-SIG field and a frame. Preamble signals 1 to 4 of the terminals 1 to 4 are orthogonal to one another. The fields disposed to the front of each of the preamble signals 1 to 4, such as a Legacy-Short Training Field (L-STF), a Legacy-Long Training Field (L-LTF), and a Legacy Signal Field (L-SIG) are fields that are recognizable by a terminal compliant with a legacy standard such as one in IEEE 802.11a, for example, and have stored therein information related to signal detection, frequency correction (channel estimation), and a transmission rate. The L-STF, the L-LTF, and the L-SIG are the same signals among the plurality of terminals performing the UL-MU-MIMO transmission. The preamble signals described above correspond to an example of a communication resource according to the present embodiment. Next, the preamble signals will be explained.

Each of the preamble signals is configured with either a known bit string or a known symbol string. By estimating the channel responses of the uplinks by using the known bit string, the base station is able to spatially separate (decode) the fields properly that are positioned to the rear of the preamble signals. It is possible to realize the spatial separation by using any of the well-known arbitrary methods such as Zero-Forcing (ZF) method, Minimum Mean Square Error (MMSE) method, and maximum likelihood estimation method, for example. In an example, each of the preamble signals is disposed in the physical header (PHY header) positioned on the head side of the MAC frame. In any of the fields positioned to the front of the preamble signals within the physical headers, because signals that are mutually the same are transmitted from the terminals, the base station is able to decode these signals even when the signals are received simultaneously. Further, the preamble signals from the terminals are orthogonal to one another. For this reason, the base station is able to individually recognize each of the preamble signals simultaneously received from the terminals. Accordingly, the base station is able to estimate the uplink channels from the terminals to the base station by using the preamble signals each corresponding to a different one of the terminals. Even though the signals that are mutually different among the terminals are transmitted in the portions positioned to the rear of the preamble signals, the base station is able to separate these signals by utilizing the estimated channel responses.

As a method for arranging the preamble signals among the terminals to be orthogonal to one another, it is possible to use any of the following methods: a time method, a frequency method, and a code method. When a time orthogonalization method is used, the preamble signal field is divided into a plurality of sections, so that the preamble signals from the terminals are transmitted in mutually-different sections. It means that in any one of the sections, only one terminal is transmitting a preamble signal. In other words, while one of the terminals is transmitting a preamble signal, the other terminals are in the time period of transmitting nothing. When the frequency orthogonalization method is used, the terminals transmit preamble signals at frequencies that are in an orthogonal relationship with one another. When the code orthogonalization method is used, the terminals transmit signals having disposed therein value sequences (or, more specifically, symbol sequences corresponding to the value sequences) contained in mutually-different rows (or mutually-different columns) of an orthogonal matrix. The rows (or the columns) of the orthogonal matrix are in an orthogonal relationship with one another. By using any of these orthogonalization methods, the base station is able to recognize the preamble signals of the terminals.

In order for the terminals to use the preamble signals that are orthogonal to one another, the base station needs to provide the terminals with information about the preamble signals to be used by the terminals and the transmission methods therefore. This information corresponds to a resource to be used in UL-MU-MIMO. More specifically, it is necessary to provide information (resource information) such as the timing with which the terminals each transmit the preamble signal (where the preamble signals may be mutually the same or mutually different among the terminals) when the time orthogonalization method is used; the frequency at which the terminals each transmit the preamble signal (where the preamble signals may be mutually different or mutually the same among the terminals) when the frequency orthogonalization method is used; or what code pattern (a pattern of which row/column in the orthogonal matrix) is to be used for transmitting the preamble signals when the code orthogonalization method is used.

(OFDMA)

OFDMA is a communication scheme by which either transmissions to the plurality of terminals or receptions from the plurality of terminals are simultaneously performed, by allocating a plurality of resource units each including one or more sub-carriers to the terminals. The resource unit is a frequency component as the smallest unit of a communication resource.

Figure 21:
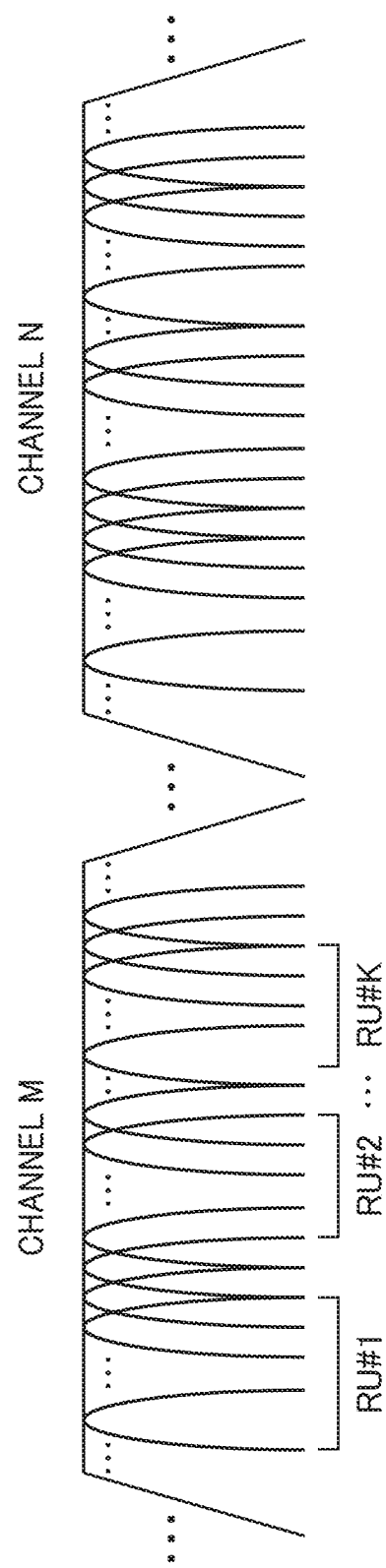
FIG. 21 is a diagram for explanation of assignment of resource units.

FIG. 21 illustrates the resource units (RU #1, RU #2 ... RU #K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not limited to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. OFDMA communication is realized by different resource units being simultaneously used by different terminals.

Figure 22:
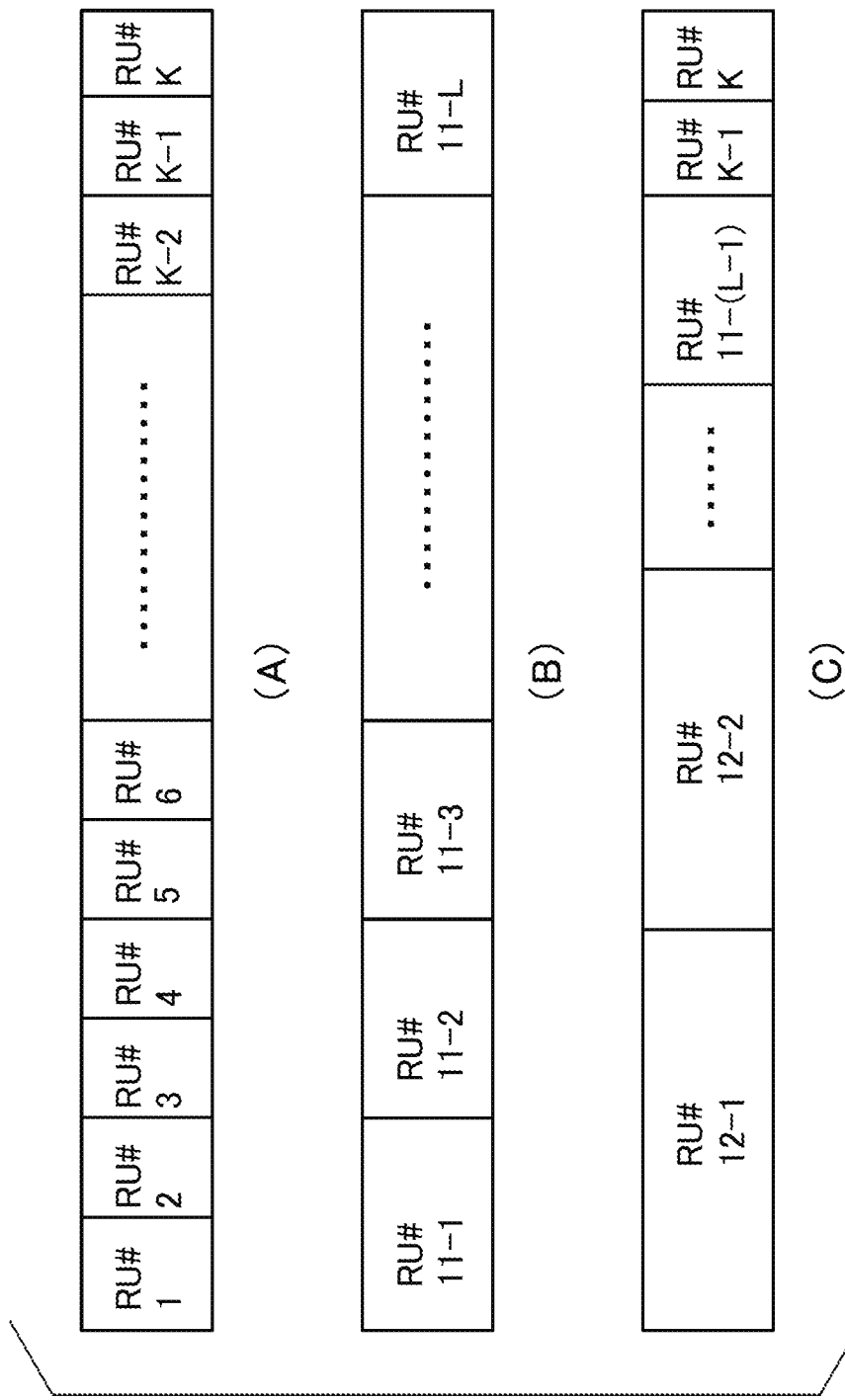
FIG. 22 is a diagram for explanation of modes of the resource unit.

The bandwidths of the resource units (or the number of the subcarriers) may be same among the resource units, or the bandwidths (or the number of the subcarriers) may vary depending on the individual resource units. An exemplary arrangement pattern of the resource units within one channel is schematically illustrated in FIG. 22. The width direction on the paper surface corresponds to the frequency domain direction. FIG. 22(A) illustrates an example where a plurality of resource units (RU #1, RU #2 ... RU #K) having the same bandwidth are arranged, and FIG. 22(B) illustrates another example where a plurality of resource units (RU #11-1, RU #11-2 ... RU #11-L) having a larger bandwidth than that of FIG. 22(A) are arranged. FIG. 22(C) illustrates a still another example where resource units with three types of bandwidths are arranged. The resource units (RU #12-1, RU #12-2) have the largest bandwidth, the resource unit RU #11-(L−1) has the bandwidth identical to that of FIG. 22(B), and the resource units (RU #K-1, RU #K) have the bandwidth identical to that of FIG. 22(A).

A specific example is illustrated. When the entire 20 MHz channel width is used, 26 tones of the total 256 subcarriers (tones) may be allocated for a single RU within the 20 MHz channel width. In other words, nine resource units are specified in the 20 MHz channel width and the bandwidth of the resource unit becomes smaller than the 2.5 MHz width. In the case of a 40 MHz channel width, 18 resource units are specified. In the case of an 80 MHz channel width, 37 resource units are specified. When this is extended, for example, in the case of a 160 MHz channel width or an 80+80 MHz channel width, 74 resource units are specified. It should be noted that the width of the resource unit is not limited to a particular value and resource units of various sizes can be arranged.

Here, the number of resource units used by each terminal is not limited to a particular value and one or a plurality of resource units may be used. When a terminal uses a plurality of resource units, a plurality of resource units that are continuous in terms of frequency may be used, or a plurality of resource units that are located at positions away from each other may be allowed to be used. The resource unit #11-1 in FIG. 22(B) may be regarded as one example of a resource unit bonding the resource units #1 and #2 in FIG. 22(A).

It is assumed here that subcarriers within one resource unit are continuous in the frequency domain. However, resource units may be defined with use of a plurality of subcarriers that are arranged in a non-continuous manner. The channels used in uplink OFDMA communication are not limited to one single channel but resource units may be reserved in another channel (see the channel N in FIG. 21, for example) arranged at a location away in the frequency domain from the channel M as the case of the channel M and thus the resource units in both the channel M and the channel N may be used. The same or different modes of arranging the resource units may be used for the channel M and the channel N. The bandwidth of the channel N is by way of example 20 MHz, 40 MHz, 80 MHz, 160 MHz, etc. as described above but not limited to them. It is also possible to use three or more channels. It is considered here that the combining of the channel M and the channel N may be regarded as one single channel.

The carrier sense may encompass both physical carrier sense associated with busy/idle of CCA (Clear Channel Assessment) and Virtual Carrier Sense based on medium reserve time described in the received frame. As in the case of the latter, a scheme for virtually determining that a medium is in the busy state, or the term during which the medium is virtually regarded as being in the busy state is called Network Allocation Vector (NAV). Here, carrier sense information based on CCA or NAV carried out in a unit of a channel may be universally applied to all the resource units within the channel. For example, resource units belonging to the channel indicated as idle by the carrier sense information are all in the idle state.

With regard to OFDMA, channel-based OFDMA is also possible in addition to the above-described resource-unit-based OFDMA. OFDMA of this case may in particular be called MU-MC (Multi-User Multi-Channel). In MU-MC, a base station assigns a plurality of channels (one channel width is, for example, 20 MHz, etc.) to a plurality of terminals, and the plurality of channels are simultaneously used to carry out simultaneous transmissions to the plurality of terminals or simultaneous receptions from the plurality of terminals.

Second Embodiment

Figure 23:
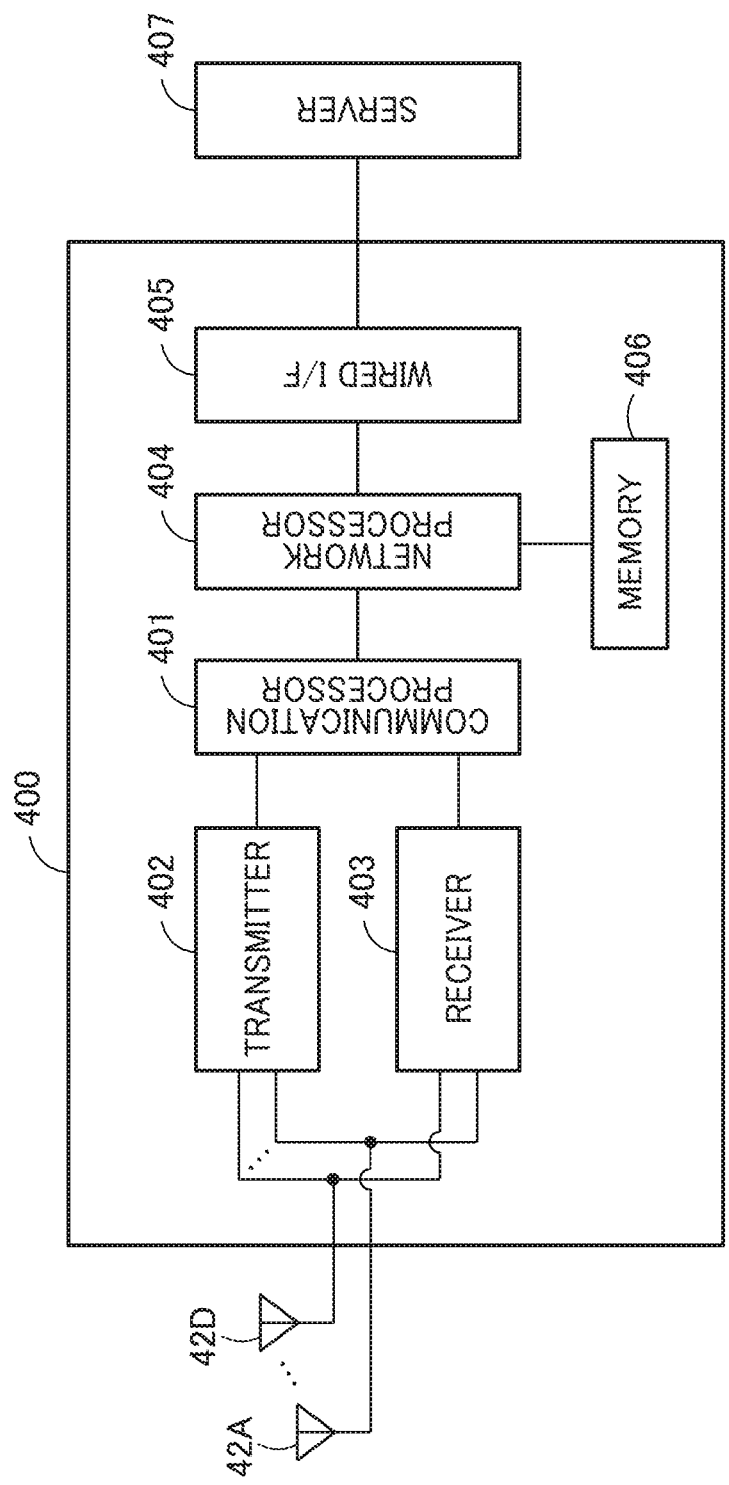
FIG. 23 is a functional block diagram of the base station or the terminal according to a second embodiment.

FIG. 23 is a functional block diagram of a base station (access point) 400 according to a second embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to the MAC processor 10 and the MAC/PHY manager 60 described in the first embodiment. The transmitter 402 and the receiver 403 have functions similar to the PHY processor 50 and the analog processor 70 described in the first embodiment. The network processor 404 has functions similar to the upper layer processor 90 described in the first embodiment. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly. In this case, a wireless I/F may be employed instead of the wired I/F 405.

The server 407 is a communication apparatus that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication apparatus operated by the user, such as a PC or a smartphone.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

In the present embodiment, although the base station with the cache function is described, a terminal (STA) with the cache function can also be realized by the same block configuration as FIG. 23.

Third Embodiment

Figure 24:
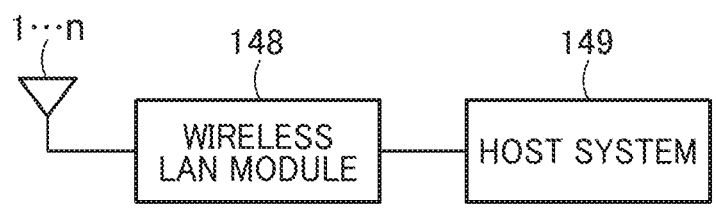
FIG. 24 is a diagram illustrating an overall configuration example of the terminal or the base station according to a third embodiment.

FIG. 24 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, and so on.

Figure 25:
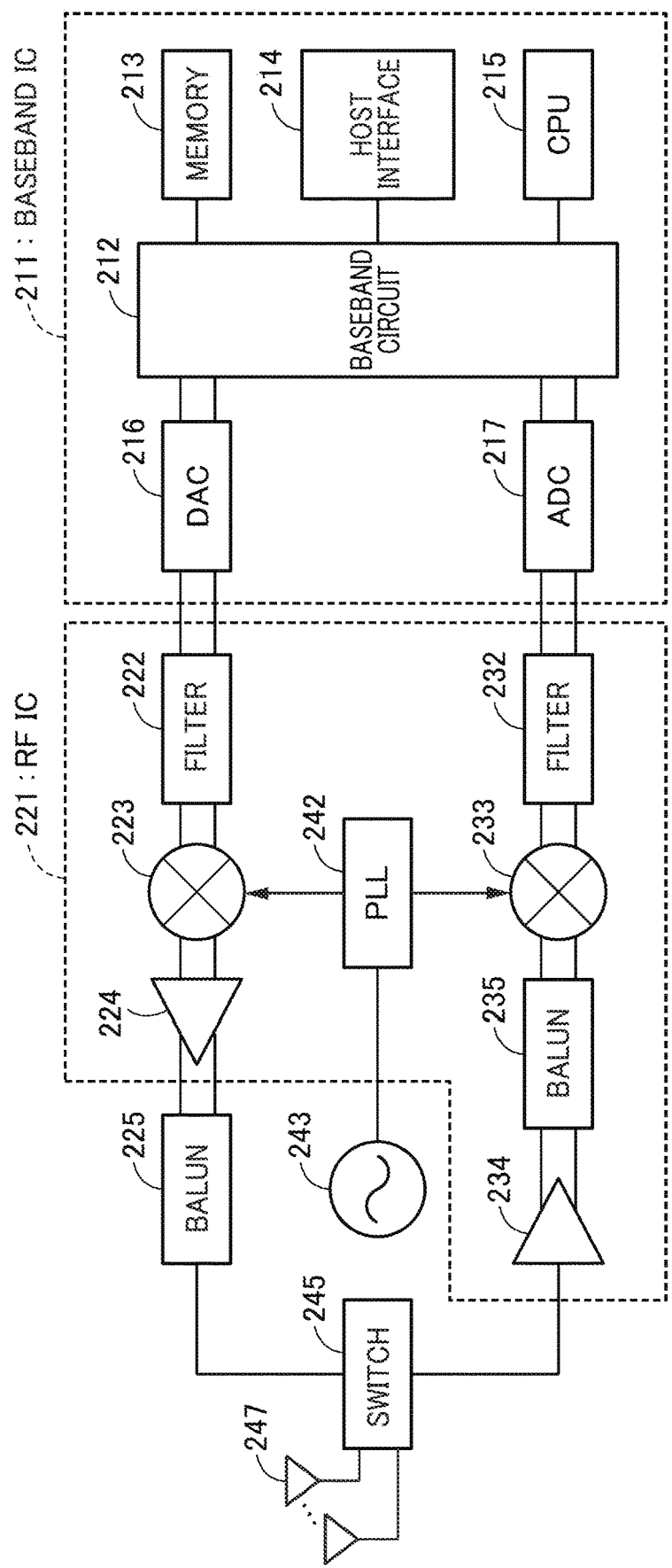
FIG. 25 is a diagram illustrating a hardware configuration example of a wireless LAN module incorporated in the terminal or base station according to the third embodiment.

FIG. 25 shows an example of hardware configuration of a wireless LAN module. The configuration can also be applied when the wireless communication device is mounted on either one of the terminal that is a non-base station and the base station. Therefore, the configuration can be applied as an example of specific configuration of the wireless communication device shown in FIG. 1. At least one antenna 247 is included in the example of configuration; however, two or more antennas may be included. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication or the controller that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

Fourth Embodiment

Figure 26:
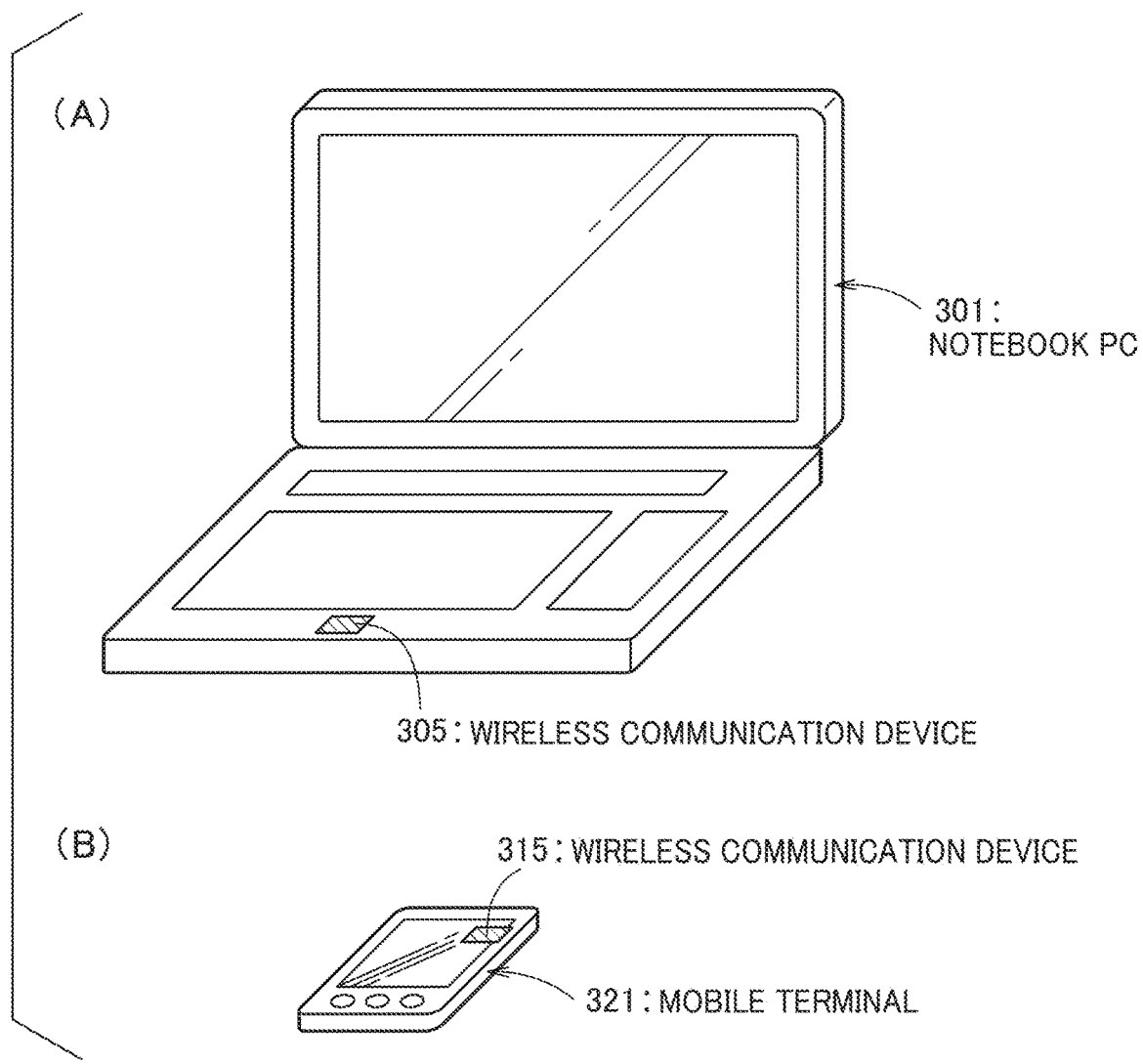
FIG. 26 is a perspective view of a wireless communication terminal according to the embodiment of the present invention.

FIG. 26(A) and FIG. 26(B) are perspective views of wireless terminal according to the fourth embodiment. The wireless terminal in FIG. 26(A) is a notebook PC 301 and the wireless communication device (or a wireless device) in FIG. 26(B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 27:
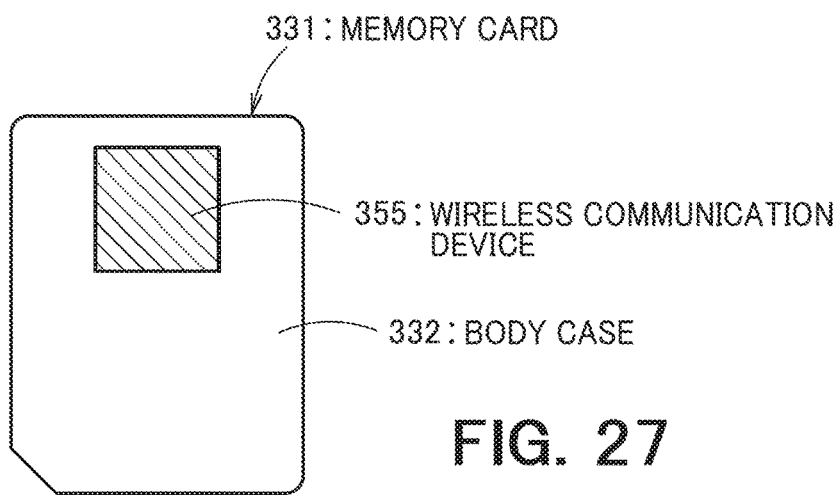
FIG. 27 is a diagram illustrating a memory card according to the embodiment of the present invention.
Figure 28:
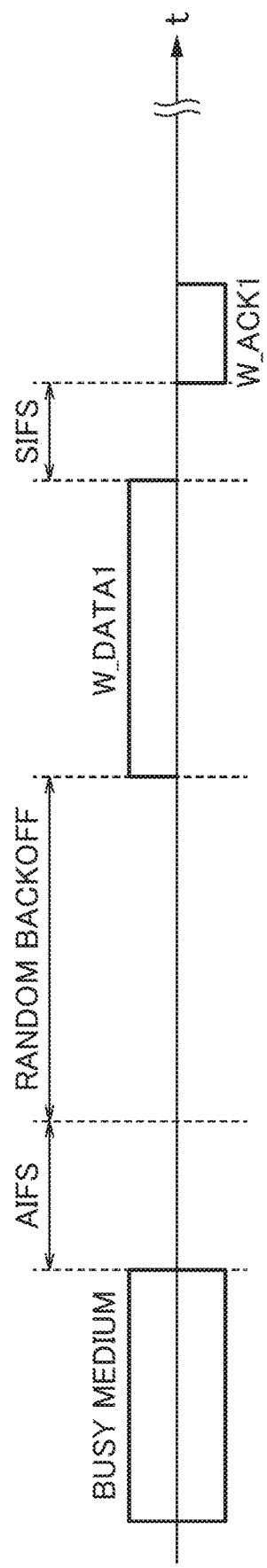
FIG. 28 is a diagram illustrating an example of frame exchange in a contention period.

Moreover, a wireless communication device installed in a terminal (which may indicate a base station) can also be provided in a memory card. FIG. 27 illustrates an example of a wireless communication device mounted on a memory card. A memory card 331 contains a wireless communication device 355 and a body case 332. The memory card 331 uses the wireless communication device 355 for wireless communication with external devices. Here, in FIG. 27, the description of other installed elements (for example, a memory, and so on) in the memory card 331 is omitted.

Fifth Embodiment

In the fifth embodiment, a bus, a processor unit and an external interface unit are provided in addition to the configuration of the wireless communication device according to any of the embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the base station or the wireless terminal according to the present embodiment. Alternatively, the processing unit may be included in the integrated circuit of the wireless communication device installed in the base station, or in the integrated circuit of the wireless communication device installed in the wireless terminal.

Sixth Embodiment

In the sixth embodiment, a clock generating unit is provided in addition to the configuration of the wireless communication device according to any of the embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Seventh Embodiment

In the seventh embodiment, a power source unit, a power source controlling unit and a wireless power feeding unit are included in addition to the configuration of the wireless communication device according to any of embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Eighth Embodiment

In the eighth embodiment, a SIM card is added to the configuration of the wireless communication device according to any of the embodiments. For example, the SIM card is connected with the MAC processor 10, the MAC/PHY manager 60 or the controller 112 in the wireless communication device. Thus, by adopting a configuration in which the SIM card is included in the wireless communication device, authentication processing can be easily performed.

Ninth Embodiment

In the ninth embodiment, a video image compressing/decompressing unit is added to the configuration of the wireless communication device according to the sixteenth embodiment. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Tenth Embodiment

In the tenth embodiment, an LED unit is added to the configuration of the wireless communication device according to any of the embodiments. For example, the LED unit is connected to at least one of the MAC processor 10, the MAC/PHY manager 60, the transmission processing circuit 113, the reception processing circuit 114 or the controller 112. Thus, by adopting a configuration in which the LED unit is included in the wireless communication device, notifying the operation state of the wireless communication device to the user can be easily done.

Eleventh Embodiment

In the eleventh embodiment, a vibrator unit is included in addition to the configuration of the wireless communication device according to any of the embodiments. For example, the vibrator unit is connected to at least one of the MAC processor 10, the MAC/PHY manager 60, the transmission processing circuit 113, the reception processing circuit 114 or the controller 112. Thus, by adopting a configuration in which the vibrator unit is included in the wireless communication device, notifying the operation state of the wireless communication device to the user can be easily done.

Twelfth Embodiment

In the twelfth embodiment, the configuration of the wireless communication device includes a display in addition to the configuration of the wireless communication device (which may indicate the wireless communication device mounted in the terminal, the wireless communication device mounted in the base station or both of them) according to any one of the above embodiments. The display may be connected to the MAC processor. As seen from the above, the configuration including the display to display the operation state of the wireless communication device on the display allows the operation status of the wireless communication device to be easily notified to a user.

Thirteenth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Here, FIG. 27 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 µs and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

Note that the frames described in the embodiments may indicate not only things called frames in, for example, IEEE 802.11 standard, but also things called packets, such as Null Data Packets.

When it is expressed that the base station transmits or receives a plurality of frames or a plurality of X-th frames, the frames or the X-th frames may be the same (for example, the same type or the same content) or may be different. An arbitrary value can be put into X according to the situation. The plurality of frames or the plurality of X-th frames may be transmitted or received at the same time or may be transmitted or received at temporally different timings.

When it is expressed that a first frame, a second frame, and the like are transmitted or received at temporally different points, the expression of the first, the second, and the like is just an expression for distinguishing the frames, and the types and the content of the frames may be the same or different.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device, comprising:
a receiver configured to receive a first frame instructing the wireless communication device to perform uplink multi-user transmission; and
a transmitter is configured to transmit a second frame in the uplink multi-user in response to the first frame; and
controlling circuitry configured to set a timer upon receiving the first frame, and change a value of a first parameter of accessing a wireless medium when the timer times out,
wherein the receiver is configured to receive a third frame including information that indicates a value for setting the timer,
wherein the controlling circuit is configured to set the timer based on the information included in the third frame, and
wherein the first parameter is a parameter used for determination of a duration of carrier sensing on the wireless medium.

2. The wireless communication device according to claim 1, wherein the first parameter is a parameter indicating at least one of a minimum value or maximum value of a contention window.

3. The wireless communication device according to claim 1, wherein the third frame is a management frame.

4. The wireless communication device according to claim 1, wherein the management frame is a beacon frame.

5. The wireless communication device according to claim 1, wherein capability of the uplink multi-user transmission can be set to any one of an enabled state or disabled state in the wireless communication device, and
the controlling circuitry does not perform to set the timer and to change the value of the first parameter if the capability is set to the disabled state, and uses a predetermined value as the value of the first parameter.

6. The wireless communication device according to claim 5, wherein the controlling circuitry is configured to set the timer upon receiving the first frame and to change the value of the first parameter from a first value to a second value when the timer times out if the capability is set to the enabled state, and
the predetermined value is the second value.

7. A wireless communication device, comprising:
a receiver configured to receive a first frame instructing the wireless communication device to perform uplink multi-user transmission; and
a transmitter is configured to transmit a second frame in the uplink multi-user in response to the first frame; and
controlling circuitry configured to set a timer upon receiving the first frame, and change a value of a first parameter of accessing a wireless medium from a first value to a second value when the timer times out, wherein the receiver is configured to receive a third frame including information that indicates at least one of the first value and the second value, wherein the controlling circuit is configured to determine, based on the information included in the third frame, at least one of: the first value and the second value of the first parameter, and wherein the first parameter is a parameter used for determination of a duration of carrier sensing on the wireless medium.

8. The wireless communication device according to claim 7, wherein the first parameter is a parameter indicating at least one of a minimum value or maximum value of a contention window.

9. The wireless communication device according to claim 7, wherein the third frame is a management frame.

10. The wireless communication device according to claim 7, wherein the management frame is a beacon frame.

11. The wireless communication device according to claim 7, wherein capability of the uplink multi-user transmission can be set to any one of an enabled state or disabled state in the wireless communication device, and the controlling circuitry does not perform to set the timer and to change the value of the first parameter if the capability is set to the disabled state, and uses a predetermined value as the value of the first parameter.

12. The wireless communication device according to claim 11, wherein the predetermined value is the second value.

13. A wireless communication method performed in a wireless communication device, comprising:

receiving a first frame instructing the wireless communication device to perform uplink multi-user transmission;

transmitting a second frame in the uplink multi-user in response to the first frame; and setting a timer upon receiving the first frame, and changing a value of a first parameter of accessing a wireless medium when the timer times out;

wherein the method further comprises:

receiving a third frame including information that indicates a value for setting the timer; and setting the timer based on the information included in the third frame, and wherein the first parameter is a parameter used for determination of a duration of carrier sensing on the wireless medium.

14. A wireless communication method performed in a wireless communication device, comprising:

receiving a first frame instructing the wireless communication device to perform uplink multi-user transmission; and transmitting a second frame in the uplink multi-user in response to the first frame; and setting a timer upon receiving the first frame, and changing a value of a first parameter of accessing a wireless medium from a first value to a second value when the timer times out, wherein the method comprises receiving a third frame including information that indicates at least one of the first value and the second value, and determining, based on the information included in the third frame, at least one of: the first value and the second value of the first parameter, and wherein the first parameter is a parameter used for determination of a duration of carrier sensing on the wireless medium.

* * * * *